(12) United States Patent
Weicker et al.

(10) Patent No.: US 9,960,458 B2
(45) Date of Patent: May 1, 2018

(54) BATTERY SYSTEMS HAVING MULTIPLE INDEPENDENTLY CONTROLLED SETS OF BATTERY CELLS

(71) Applicant: QuantumScape Corporation, San Jose, CA (US)

(72) Inventors: Phil Weicker, San Jose, CA (US); Brian Pevear, San Jose, CA (US); Jay Underwood, San Jose, CA (US); Tim Holme, San Jose, CA (US); Wes Hermann, San Jose, CA (US)

(73) Assignee: QuantumScape Corporation, San Jose, CA (US)

( * ) Notice: Subject to any disclaimer, the term of this patent is extended or adjusted under 35 U.S.C. 154(b) by 98 days.

(21) Appl. No.: 15/142,919

(22) Filed: Apr. 29, 2016

(65) Prior Publication Data

US 2016/0380315 A1    Dec. 29, 2016

Related U.S. Application Data

(60) Provisional application No. 62/183,337, filed on Jun. 23, 2015.

(51) Int. Cl.
*H01M 10/44* (2006.01)
*H02J 7/00* (2006.01)
*H01M 10/0525* (2010.01)

(52) U.S. Cl.
CPC ......... *H01M 10/441* (2013.01); *H02J 7/0063* (2013.01); *H01M 10/0525* (2013.01); *H02J 2007/0067* (2013.01); *Y02E 60/122* (2013.01)

(58) Field of Classification Search
CPC . H01M 10/441; H01M 10/0525; H02J 7/0063
(Continued)

(56) References Cited

U.S. PATENT DOCUMENTS 5,369,351 A * 11/1994 Adams ................... A61N 1/378
320/121
7,148,637 B2 * 12/2006 Shu ...................... B60L 11/1822
318/139

(Continued)

FOREIGN PATENT DOCUMENTS

WO    WO 2015/031908    3/2015
WO    WO 2015/054320    4/2015

(Continued)

*Primary Examiner* — M'Baye Diao
(74) *Attorney, Agent, or Firm* — Squire Patton Boggs (US) LLP

(57) ABSTRACT

Provided are battery systems having multiple independently controlled sets of battery cells and method of using these systems to power, for example, drive trains of electric and hybrid vehicles. A battery system includes two or more sets of battery cells. Each set can be discharged and/or charged independently of another set based on different factors, such as a current power demand, power output capabilities of each set, and other like factors. One or multiple sets can be used to deliver power at any given time. In some embodiments, one set may be used to charge another set in the same power system. The same or different types of battery cells may be used in different sets. For example, one set may have battery cells having a higher power output capability, while another set may have battery cells with a higher energy density.

37 Claims, 15 Drawing Sheets

(58) Field of Classification Search
USPC .......................................................... 320/136
See application file for complete search history.

(56) References Cited

U.S. PATENT DOCUMENTS

| | | | |
|---|---|---|---|
| 7,761,198 B2* | 7/2010 | Bhardwaj | F02N 11/0866 |
| | | | 104/34 |
| 7,933,695 B2* | 4/2011 | Yamaguchi | B60K 6/28 |
| | | | 180/65.29 |
| 8,190,320 B2 | 5/2012 | Kelty et al. | |
| 8,471,521 B2 | 6/2013 | Stewart et al. | |
| 8,543,270 B2 | 9/2013 | Kelty et al. | |
| 9,106,077 B2* | 8/2015 | Nakahara | H01M 10/441 |
| 9,393,921 B1* | 7/2016 | Weicker | G01R 31/3651 |
| 2011/0267007 A1* | 11/2011 | Chen | H01M 10/441 |
| | | | 320/126 |
| 2013/0101878 A1* | 4/2013 | Pilgram | H01M 4/13 |
| | | | 429/99 |
| 2014/0117291 A1 | 5/2014 | Amatucci et al. | |
| 2014/0170493 A1 | 6/2014 | Holme et al. | |
| 2014/0265554 A1 | 9/2014 | Yang et al. | |
| 2015/0243974 A1* | 8/2015 | Holme | H01M 4/366 |
| | | | 318/139 |
| 2016/0049655 A1 | 2/2016 | Fasching et al. | |
| 2016/0059733 A1* | 3/2016 | Hettrich | B60L 11/1875 |
| | | | 701/2 |
| 2016/0164135 A1 | 6/2016 | Fasching et al. | |

FOREIGN PATENT DOCUMENTS

| | | |
|---|---|---|
| WO | WO 2015/076944 | 5/2015 |
| WO | WO 2015/103548 | 7/2015 |
| WO | WO 2016/106321 | 6/2016 |

* cited by examiner

BATTERY SYSTEMS HAVING MULTIPLE INDEPENDENTLY CONTROLLED SETS OF BATTERY CELLS

This application claims priority to, and the benefit of, U.S. Provisional Patent Application No. 62/183,337, filed Jun. 23, 2015, the entire contents of which are herein incorporated by reference in its entirety for all purposes.

BACKGROUND

The present disclosure relates to battery systems having multiple sets of battery cells such that these sets are independently controlled during operation of the battery systems. More specifically, each set may be independently discharged and/or charged and have a different state of charge than any other set in the same battery system.

Battery systems are becoming more prevalent in a variety of electronic applications, from consumer electronics to electric vehicles. However, many challenges still remain to be addressed before these battery systems will compete or overtake conventional energy and power sources. For a long time, car batteries were primarily used to start vehicle internal combustion engines and/or supply electricity to various electronics of the vehicles, but were not used to power the drivetrain. With the advent of new battery technologies, more vehicles now utilize battery systems as a traction power source, such as traction batteries or secondary batteries for electrical vehicles. Most secondary (i.e., rechargeable) batteries useful as traction power sources, particularly high energy density batteries, do not function well at low temperatures and/or become unsafe or quickly degrade at high temperatures. Furthermore, different types of batteries may have different performance characteristics. For example, some batteries may have high energy density but low power output. Other batteries have high power output but low energy density. Power output characteristics may also vary differently with the state of charge for different types of batteries. Finally, different types of batteries have different operating temperature requirements.

When a particular type of battery cells is used for a particular application, it is often very difficult to address various different and often competing requirements, which results in many design compromises. For example, in a vehicle application, increasing the power output of a battery cell, which is needed to accelerate the vehicle, generally causes reduction in the cells' energy density, which reduces the range of the vehicle. At the same time, when different battery types are integrated into the same battery system, these challenges are further complicated by system requirements for exchanging energy (e.g., heat, electricity) between the different battery types, in ways that are efficient and commercially cost-effective.

Conventional battery systems and thermal management systems thereof have been inadequate to address the aforementioned challenges. Furthermore, conventional battery systems generally use a single type of battery for a given application. For example, an electrical car is typically powered by a single type of lithium ion battery, e.g., lithium cobalt oxide batteries, lithium iron phosphate batteries, and the like. As such, much work is still needed in the field to which the instant disclosure pertains to improve performance of battery systems, to more efficiently utilize new battery materials, and to integrate more than one type of battery into a given application.

SUMMARY

Provided are battery systems having multiple independently controlled sets of battery cells and method of using these systems to power, for example, drive trains of electric and hybrid vehicles. A battery system includes two or more sets of battery cells. Each set can be discharged and/or charged independently of another set based on different factors, such as a current power demand, power output capabilities of each set, and other like factors. One or multiple sets can be used to deliver power at any given time. In some embodiments, one set may be used to charge another set in the same power system. The same or different types of battery cells may be used in different sets. For example, one set may have battery cells having a higher power output capability, such as cells having lithium intercalation materials or lithium alloying materials. Another set may have battery cells with a higher energy density, such as cells having conversion chemistry materials. This power output capability relationship may remain for some operating conditions. However, in some cases, for example, at some temperatures, discharge states, and other conditions, the power output capability relationship may be different. Various power output capability relationships are described below and will be generally understood by one having ordinary skill in the art.

In some embodiments, a method includes providing a battery system including a first set of one or more first battery cells and a second set of one or more second battery cells. The first set has a first power output capability when the first set is at a first state of charge. The second set has a second power output capability when the second set is at a second state of charge. At this state, the second power output capability may be greater than the first power output capability. This may be attributed to the different state of charge, different types of batteries, and/or other factors. The method may proceed with discharging the first set to the first state of charge. At this point, after the first set is discharged to the first state of charge, the second set is at the second state of charge. The method may proceed with discharging the second set below the second state of charge, for example, right after the first set is discharged to the first state of charge. In this case, the set with a higher power capability (the second set having the second power output capability in the above example) is used for the discharge. The second set may be selected for the discharge based on the current power demand of a load device, for example. It should be noted that both sets may have the same types of cells, in some embodiments, and the higher power capability may be achieved by having certain conditions in one set (e.g., higher temperature, higher state of charge) than in the other set having a lower power output capability. Alternatively, different sets may be formed from different types of cells and power capability may depend on the type of cells in addition to the conditions at which cells are currently in (e.g., state of charge, temperature).

Also provided is a battery system including a first set of one or more first battery cells, a second set of one or more second battery cells, and controller. The one or more first battery cells include a conversion chemistry material. The one or more second battery cells include a lithium intercalation material or a lithium alloying material. The one or more second battery cells may alternatively include a second type of conversion chemistry material or a hybrid combination of a conversion chemistry material with a lithium intercalation material or a lithium alloying material. The controller is configured to monitor the state of charge of each of the first set and the second set and electrically coupling one or more of the first set and the second set to a load device.

Provided also is a method of operating a battery system having two different sets of battery cells. The method may involve providing the battery system including a first set of one or more first battery cells and a second set of one or more second battery cells. The first set has a first power output capability and a first energy density. The second set has a second power output capability and a second energy density. In certain conditions, the first power output capability is higher than the second power output capability. It should be noted that the power output capability of each set may vary with the state of charge, temperature, and other conditions of each set. It may also be a factor of the type of cells used in each set. In some cases, the reference may be made to average power output capabilities to differentiate cells and corresponding sets that on average have higher or lower power output capabilities than other cells and corresponding sets. The average power output capabilities represent averages over different operating conditions of the first and second sets for a given application. In some embodiments, the first energy density is lower than the second energy density. The method may proceed with selectively discharging one or both of the first set and the second set based on a current power demand and based on the second power output capability. Specifically, if the current power demand is greater than the current second power output capability (which may also change over time), then the first set may be discharged during this operation. The first set may be discharge by itself or together with discharging the second set. Alternatively, if the current power demand is less than the current second power output capability (which may also change over time), then the second set may be discharged by itself. The method may involve repeating discharging at least once for a new power demand.

Also provided is a battery system including a first set of one or more first battery cells and a second set of one or more second battery cells. The first set has a first power output capability and a first energy density. The one or more first battery cells include a conversion chemistry material. The second set has a second power output capability and a second energy density. The first power output capability is in certain conditions higher than the second power output capability. The first energy density is lower than the second energy density.

Also provided is a drive train including a first motor control unit, second motor control unit, first set of one or more first battery cells electrically coupled to the first motor control unit, second set of one or more second battery cells electrically coupled to the second motor control unit, and electrical motor. The operating voltage of the first set is different from the operating voltage of the second set. The electrical motor includes a first stator, second stator, and rotor electromagnetically coupled to the first stator and second stator. The first motor control unit is electrically coupled to the first stator and the rotor, while the second motor control unit is electrically coupled to the second stator and the rotor.

Also provided is a drive train including a first motor control unit, second motor control unit, first set of one or more first battery cells electrically coupled to the first motor control unit, second set of one or more second battery cells electrically coupled to the second motor control unit, and electrical motor. The operating voltage of the first set is different from the operating voltage of the second set. The electrical motor includes a first rotor, second rotor, and stator electromagnetically coupled to the first rotor and the second rotor. The first motor control unit is electrical coupled to the first rotor and the stator, while the second motor control unit is electrical coupled to the second rotor and the stator.

Also provide is an electrically powered vehicle including a first motor control unit, second motor control unit, first set of one or more battery cells electrically coupled to the first motor control unit, and second set of one or more battery cells electrically coupled to the second motor control unit. The operating voltage of the first set is different from the operating voltage of the second set. The electrical vehicle also includes a first electrical motor electrically coupled to the first motor control unit and a second electrical motor electrically coupled to the second motor control unit. Furthermore, the electrical vehicle includes a first wheel and second wheel for supporting the electrically powered vehicle on a road. The first wheel is mechanically coupled to the first electrical motor, while the second wheel is mechanically coupled to the second electrical motor. Additional wheels may be included as well.

These and other embodiments are described further below with reference to the figures.

BRIEF DESCRIPTION OF THE DRAWINGS

Figure 1:
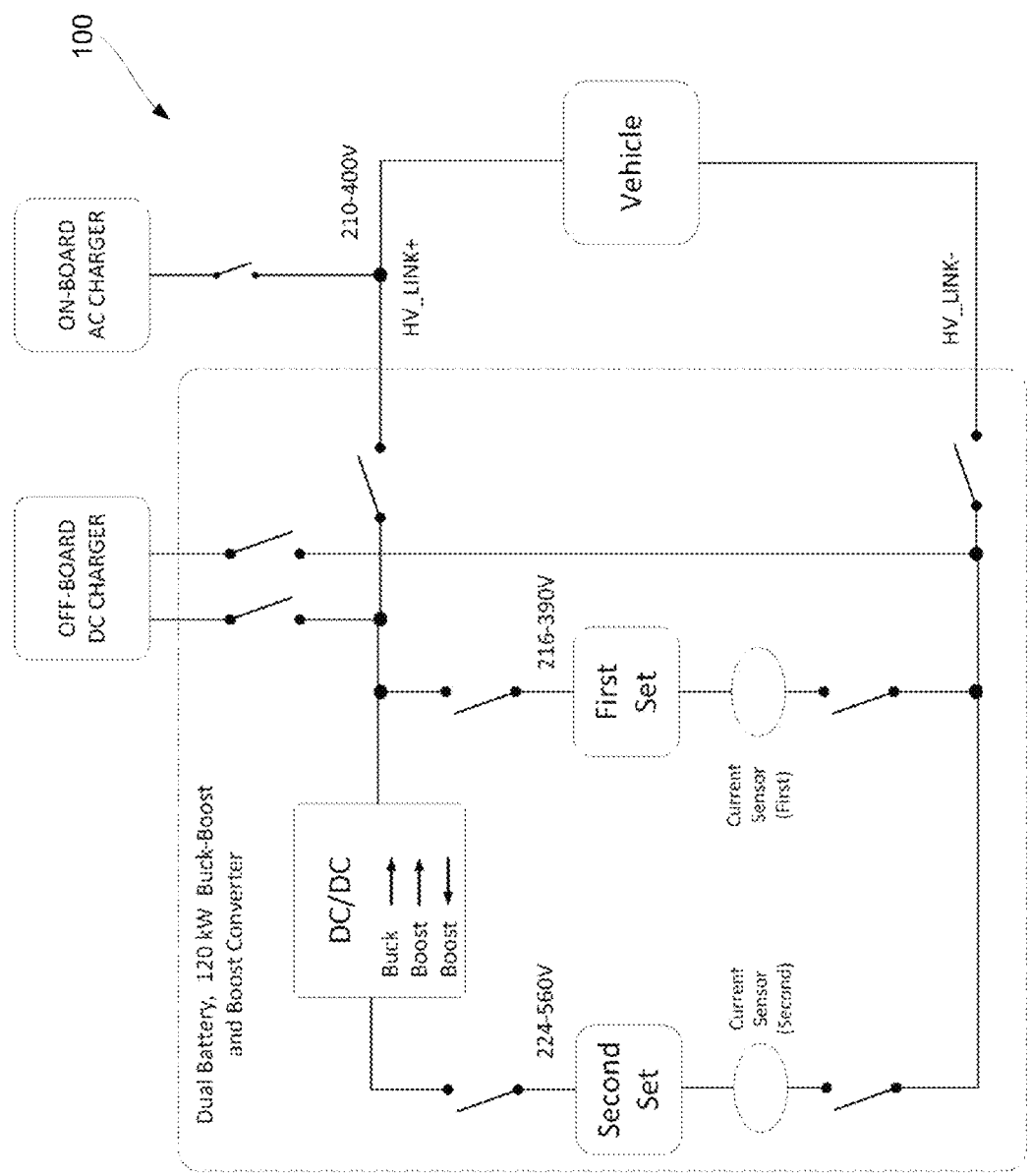

Having thus described examples of the disclosure in general terms, reference will now be made to the accompanying drawings, which are not necessarily drawn to scale, and wherein like reference characters designate the same or similar parts throughout the several views, and wherein:

FIG. 1 is a more specific representation of a battery system, in accordance with some embodiments.

Figure 2A:
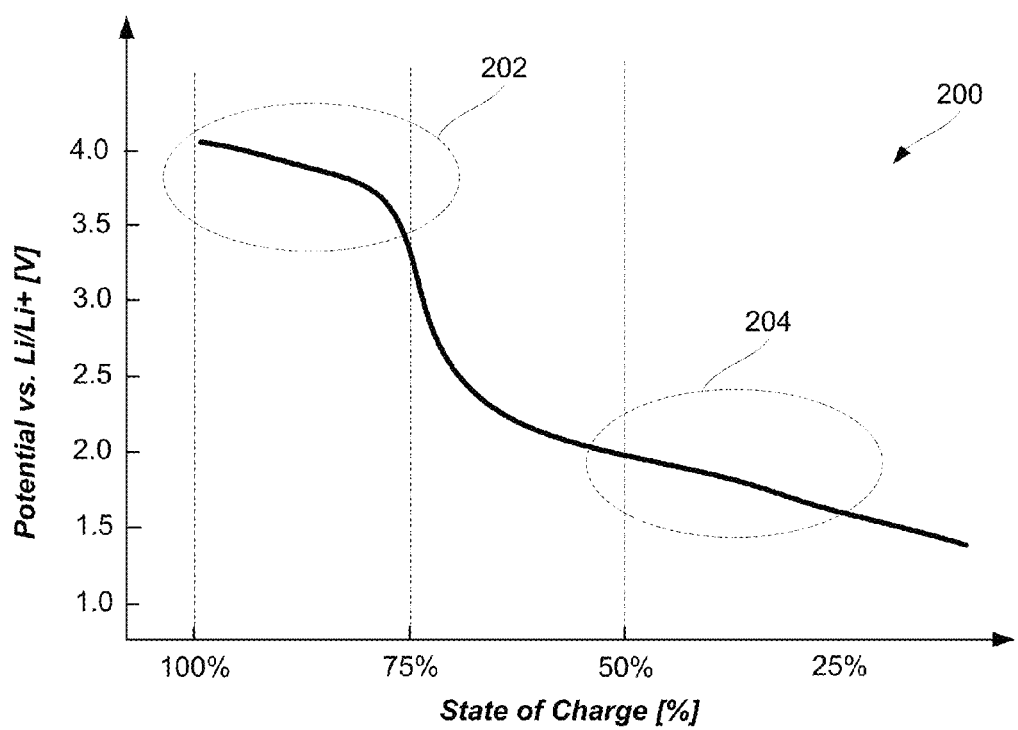

FIG. 2A illustrates a schematic discharge curve of a single battery cell, in accordance with some embodiments.

Figure 2B:
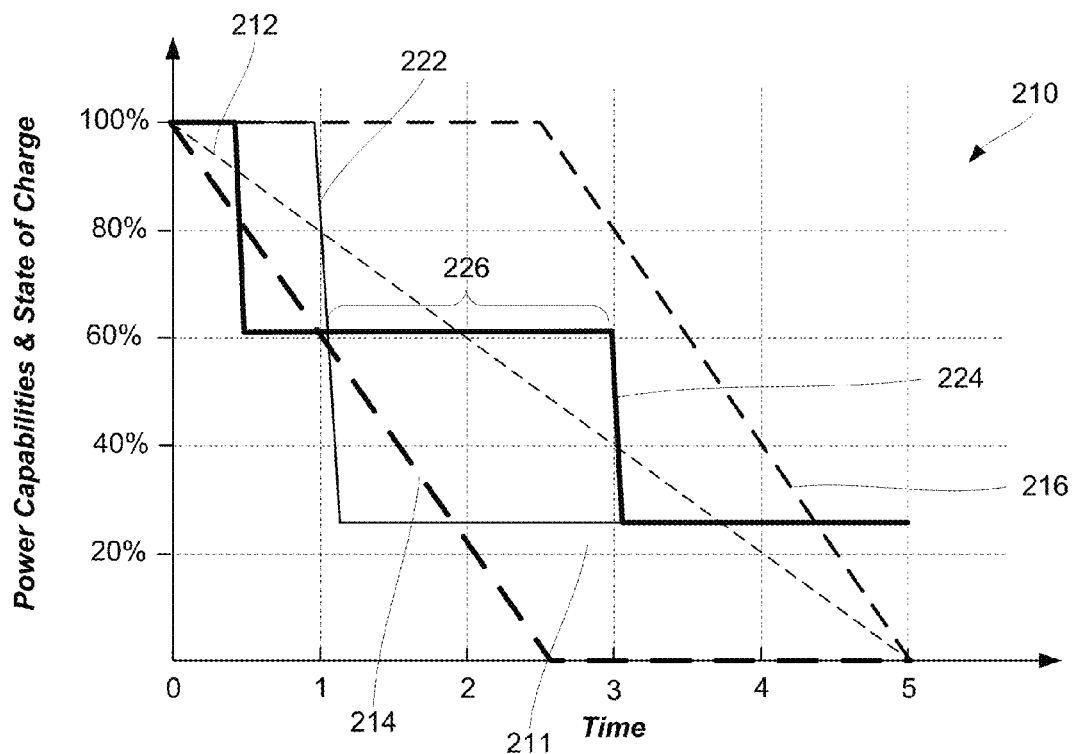

FIG. 2B illustrates schematic plots representing power capabilities and state of charges of a battery system and individual sets of battery cells in this battery system, in accordance with some embodiments.

Figure 2C:
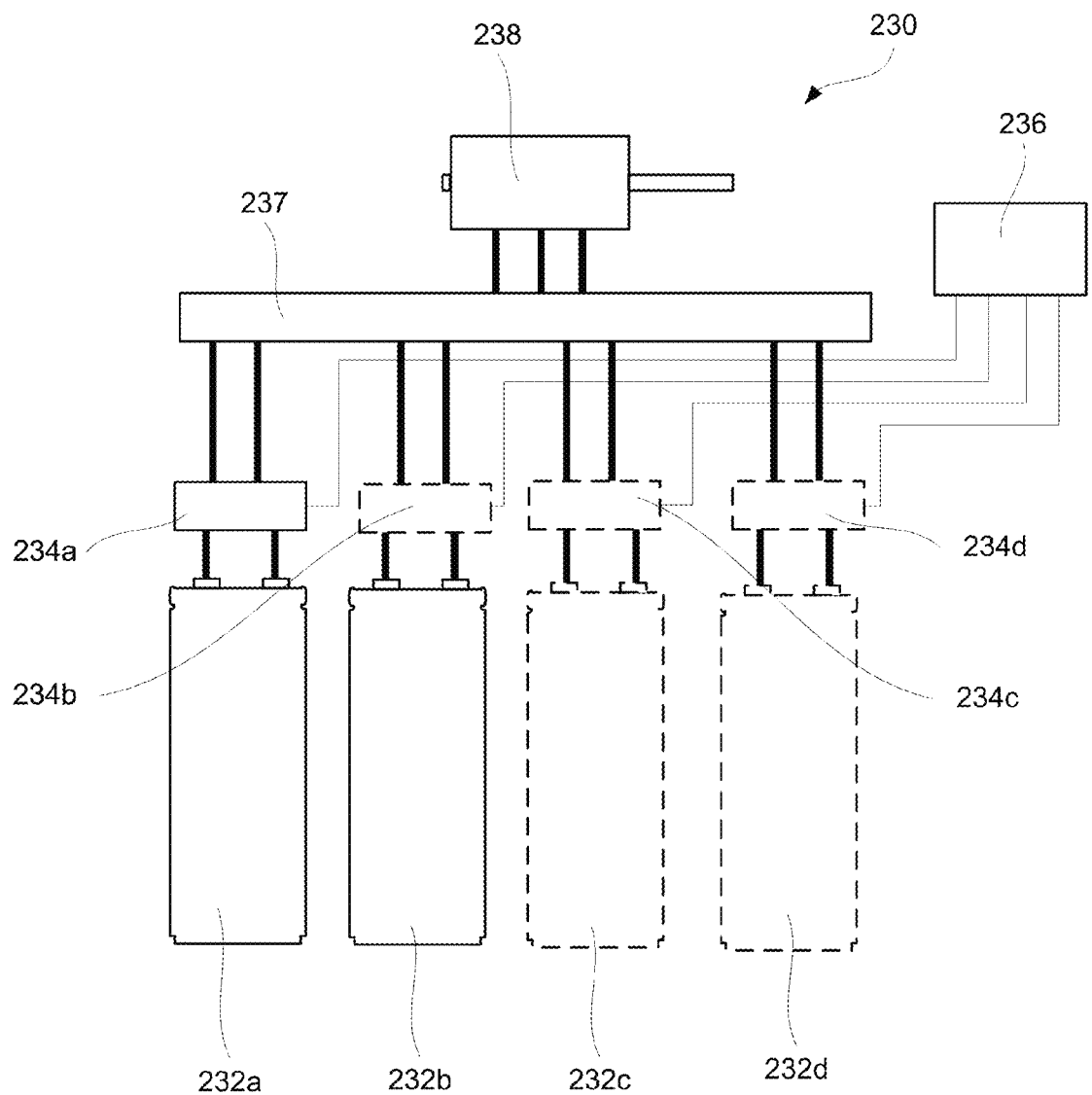

FIG. 2C is a schematic representation of the battery system providing the power capabilities shown in FIG. 2B, in accordance with some embodiments.

Figure 2D:
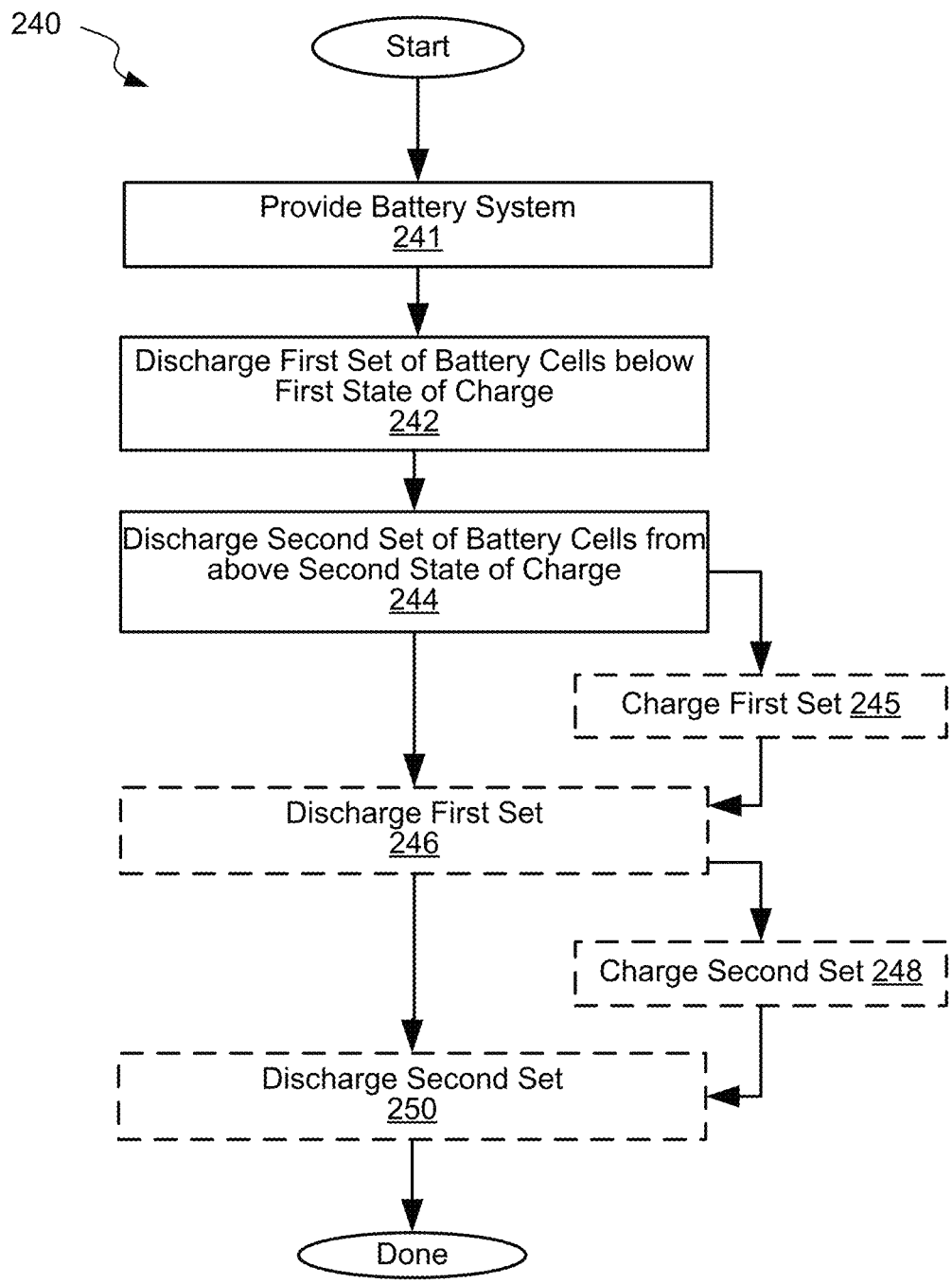

FIG. 2D is a process flowchart corresponding to a method of operating the battery system shown in FIG. 2C to achieve the power capabilities shown in FIG. 2B, in accordance with some embodiments.

Figures 1, 3A:
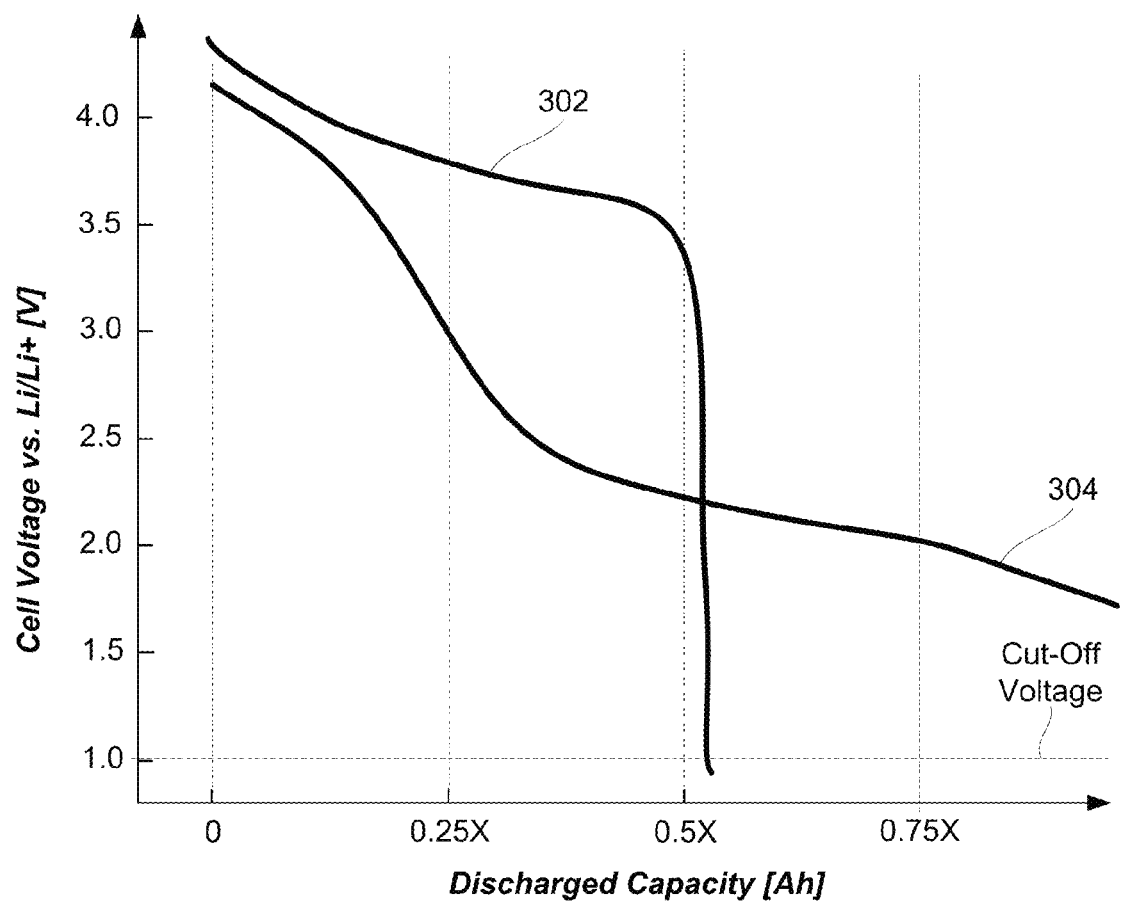

FIG. 3A-1 illustrates two schematic discharge curves of different types of battery cells as a function of the state of charge, in accordance with some embodiments.

Figures 2, 3A:
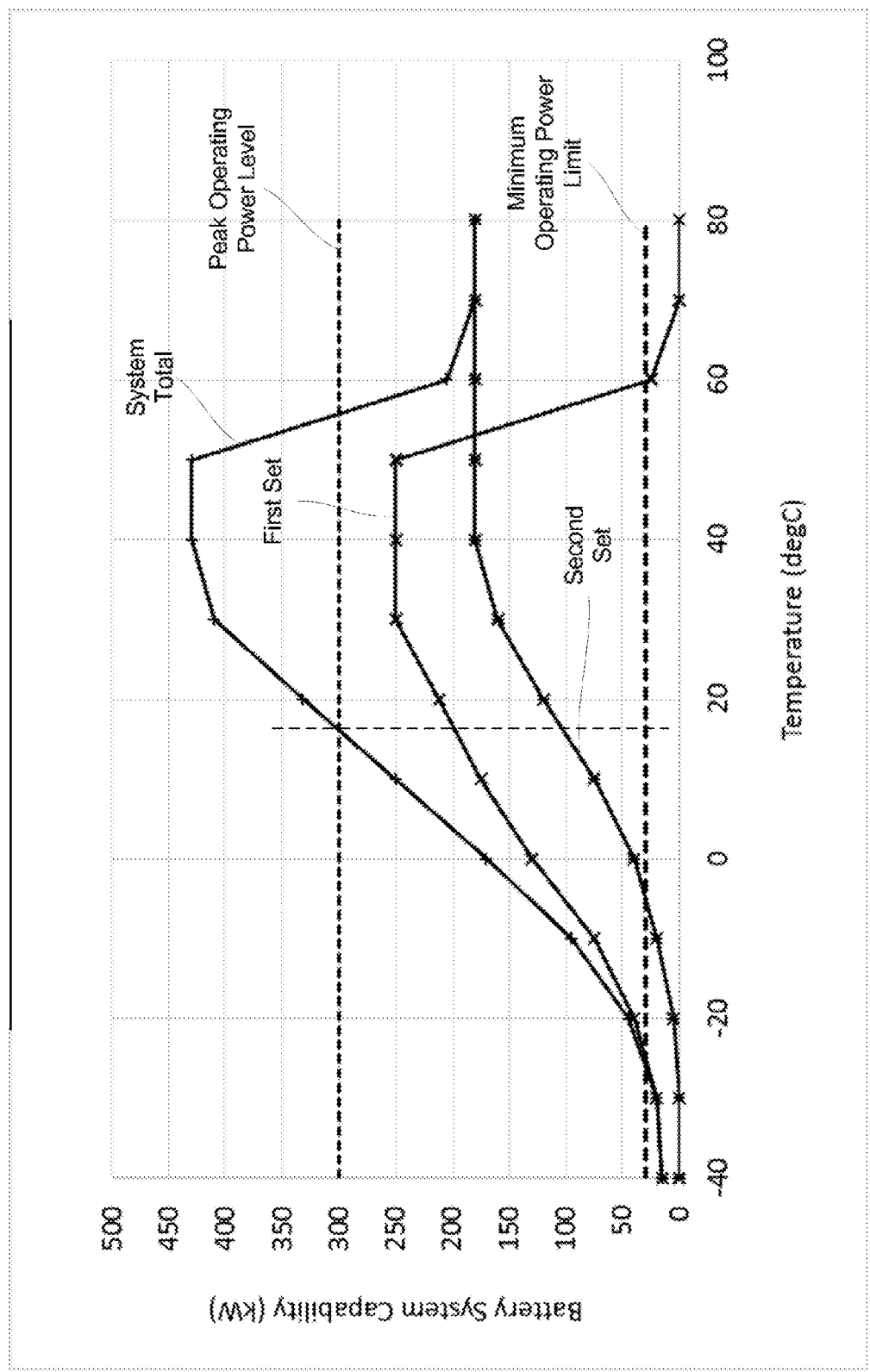

FIG. 3A-2 illustrates schematic power capability plots for two different types of battery cells as a function of the battery cell temperature, in accordance with some embodiments.

Figure 3B:
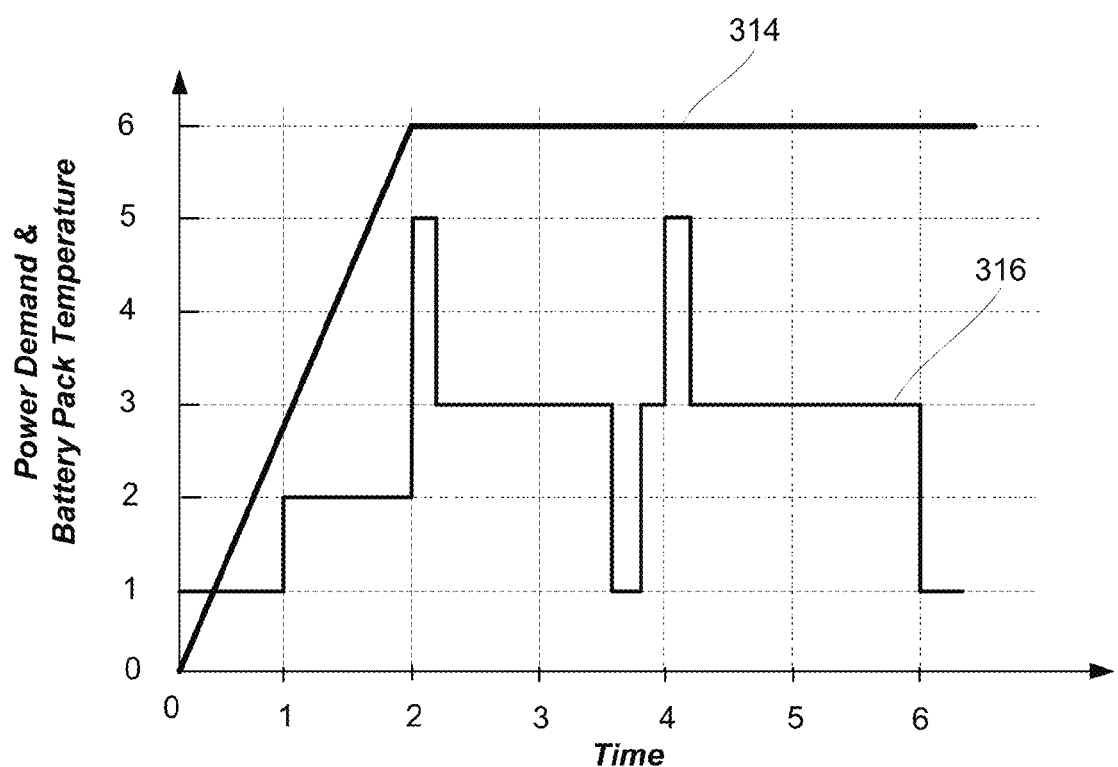
Figure 3C:
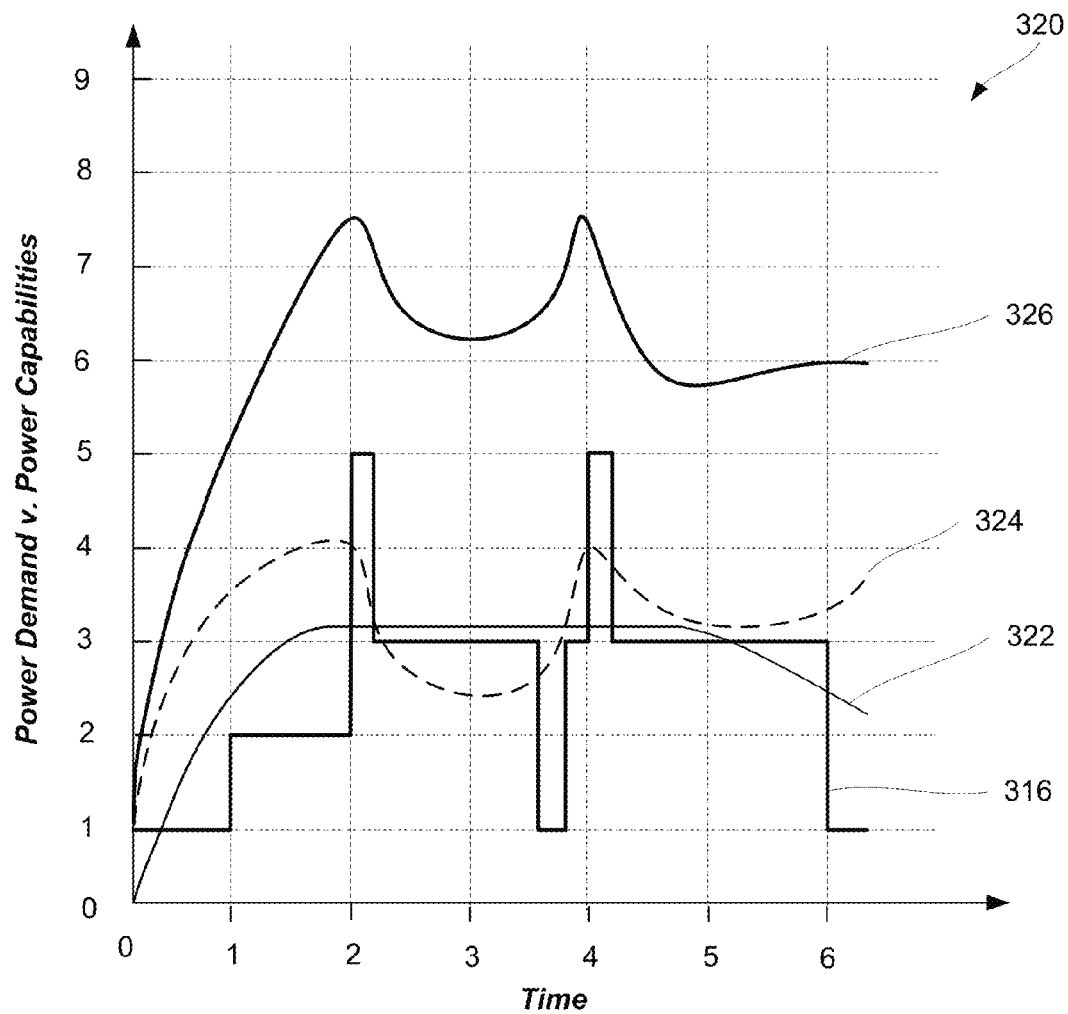

FIG. 3B illustrates schematic examples of power demand and temperature of a drive train (and of a battery system) for a vehicle application, in accordance with some embodiments FIG. 3C illustrates schematic examples of power demand and power capabilities of each set of battery cells in a battery system as well as the overall power capability of the entire system, in accordance with some embodiments.

Figures 1, 3D:
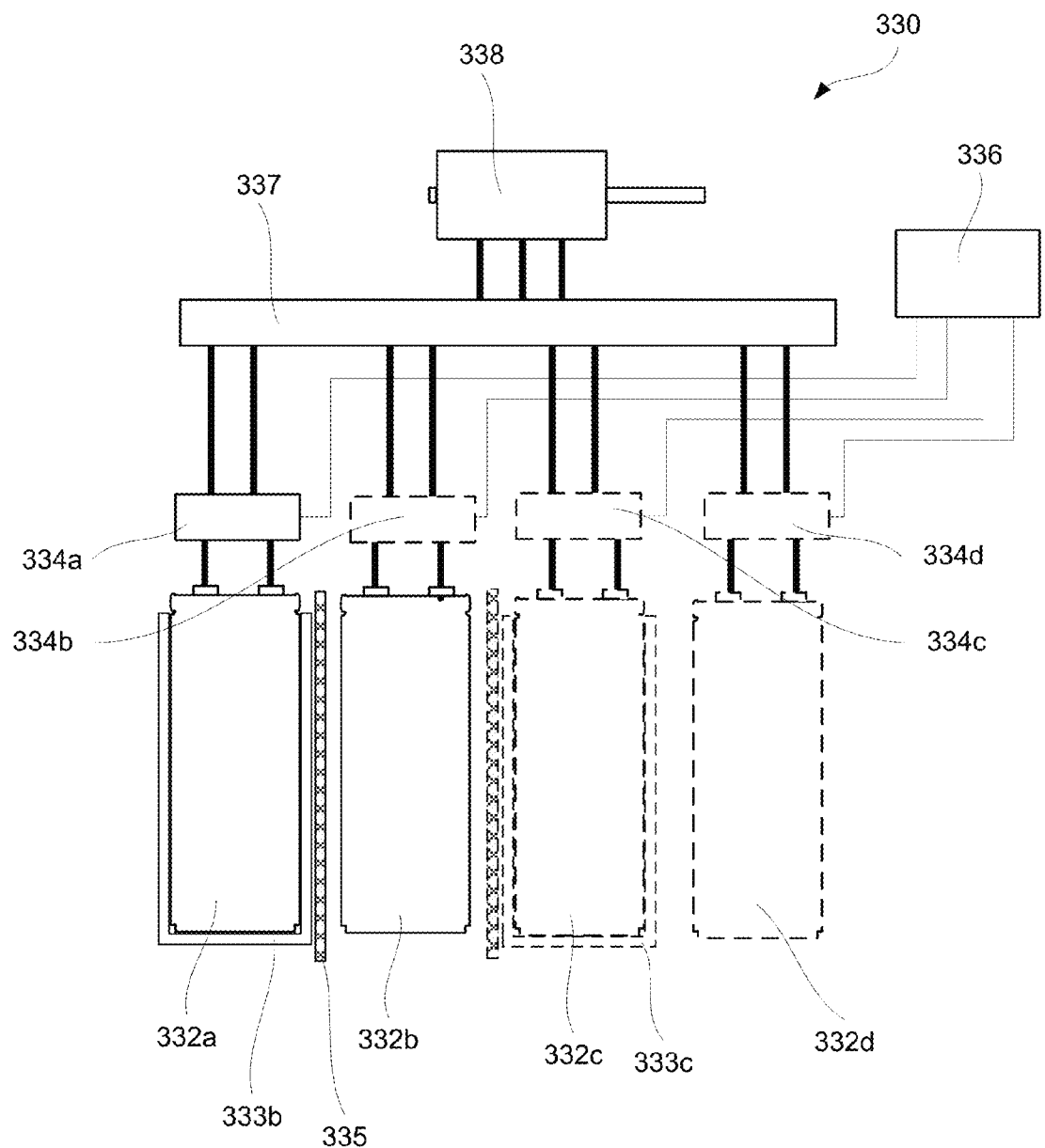
Figures 2, 3D:
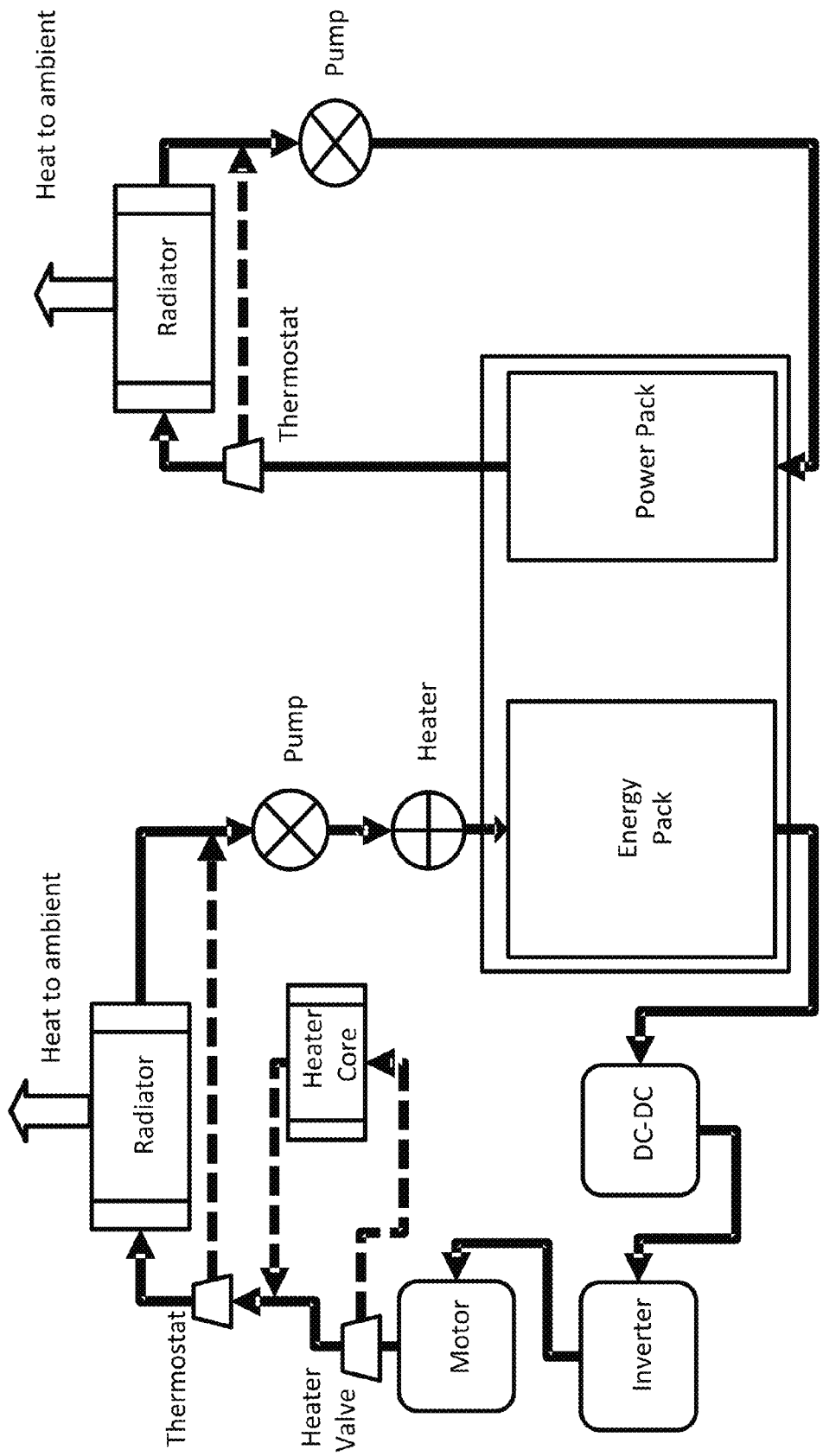

FIG. 3D-1 is a schematic representation of the battery system providing the power capabilities shown in FIG. 3C, in accordance with some embodiments.

FIG. 3D-2 is a schematic representation of a heat management in a vehicle including a battery system, in accordance with some embodiments.

Figures 1, 3E:
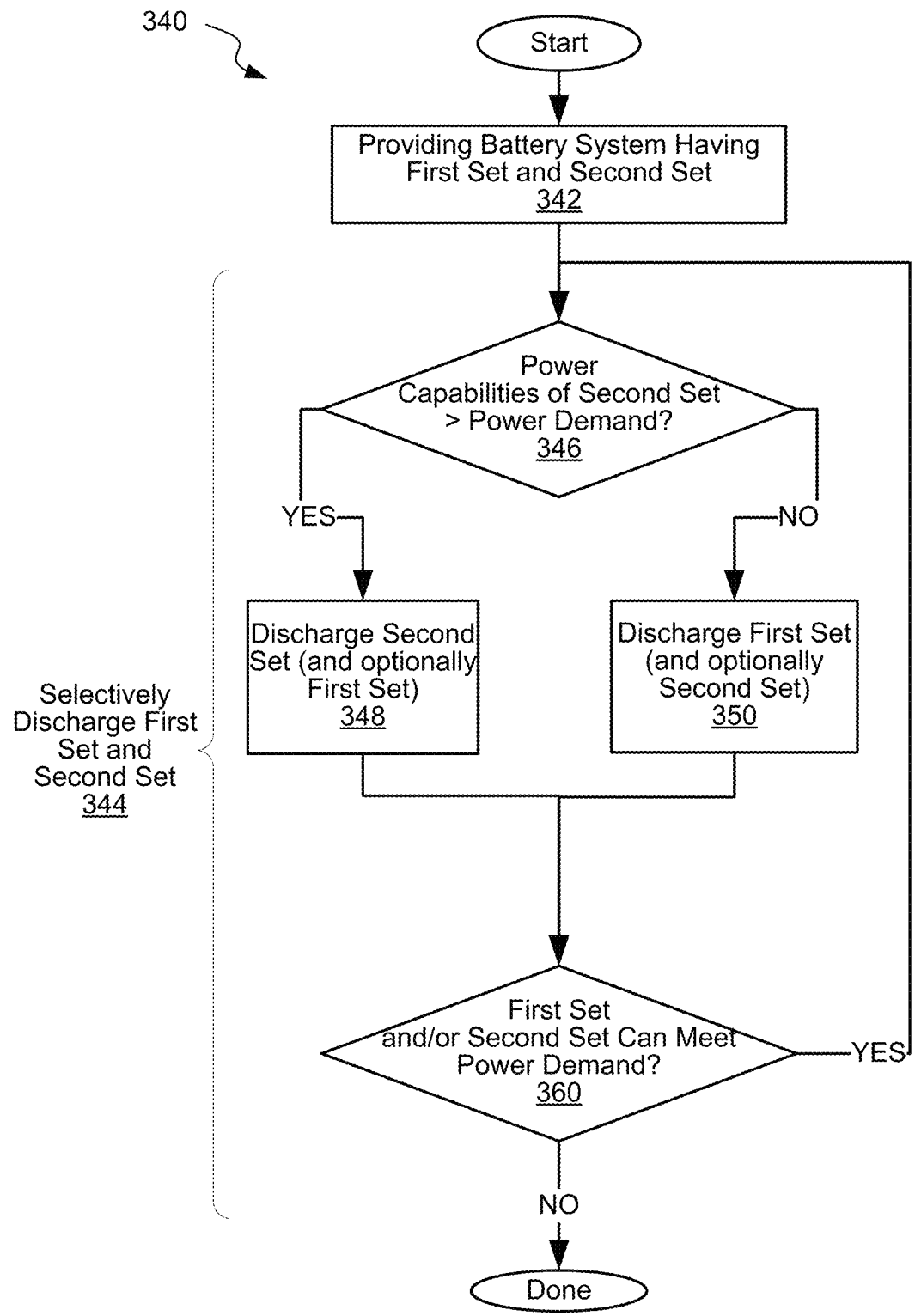
Figures 2, 3E:
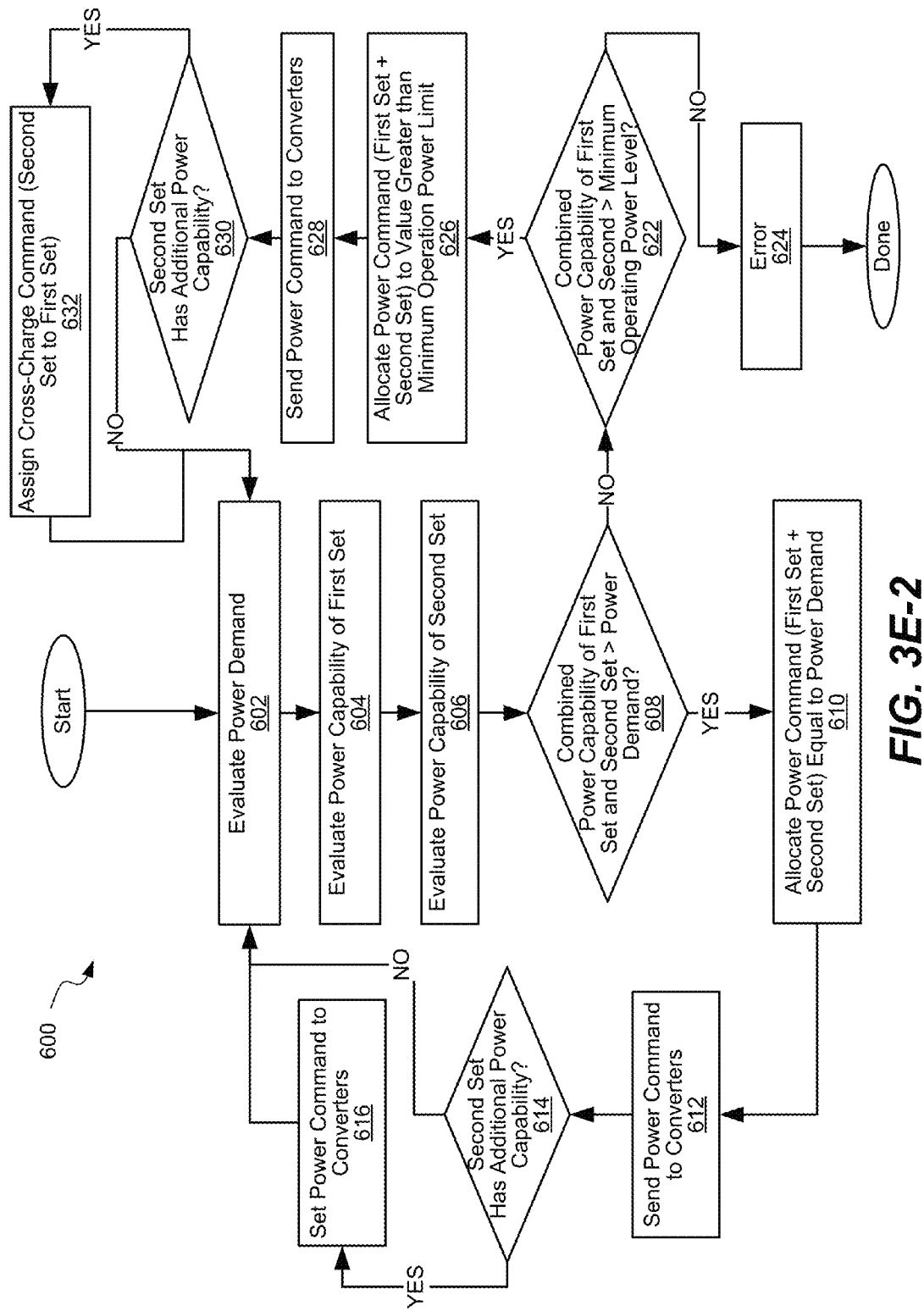

FIG. 3E-1 is a process flowchart corresponding to a method of operating the battery system to achieve the power capabilities shown in FIG. 3C, in accordance with some embodiments.

FIG. 3E-2 is a process flowchart corresponding to an example of a method of operating a battery system, in accordance with some embodiments.

Figure 4A:
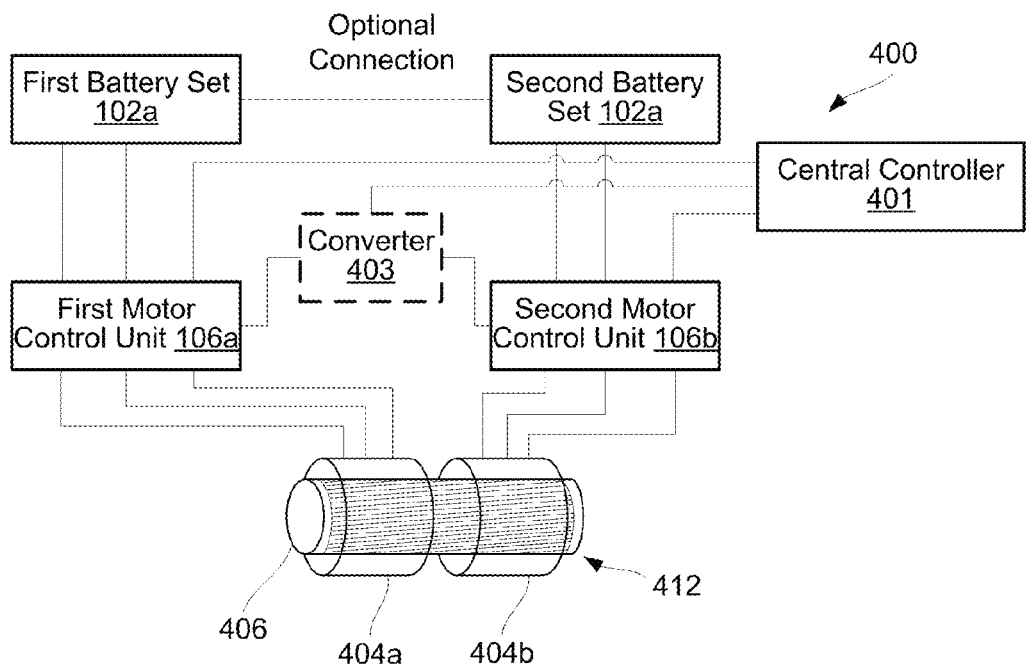

FIG. 4A is a schematic representation of a battery system having different rotors of the same motor powered by different batteries, in accordance with some embodiments.

Figure 4B:
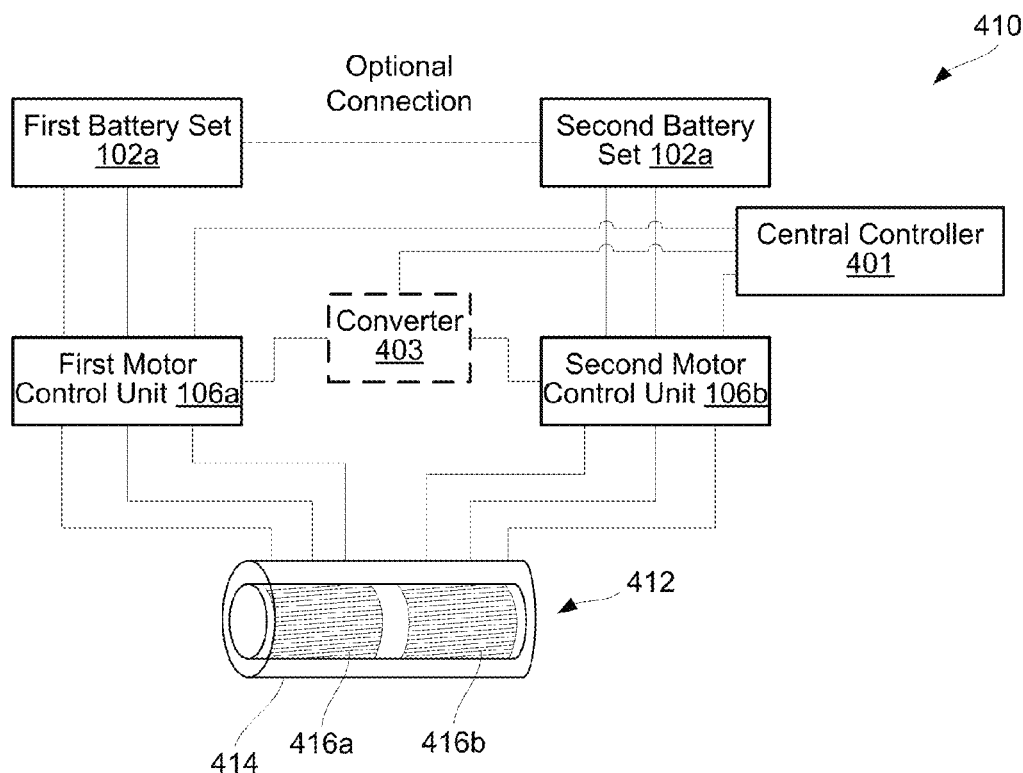

FIG. 4B is a schematic representation of a battery system having different stators of the same motor powered by different batteries, in accordance with some embodiments.

Figure 4C:
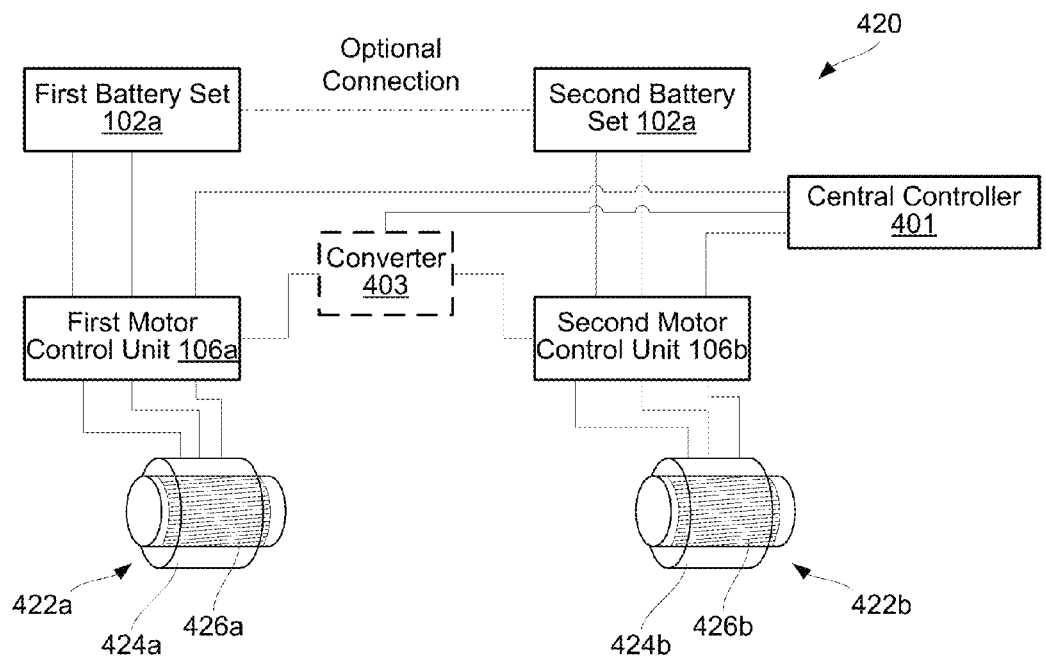

FIG. 4C is a schematic representation of a battery system having different motors powered by different batteries, in accordance with some embodiments.

Figure 4D:
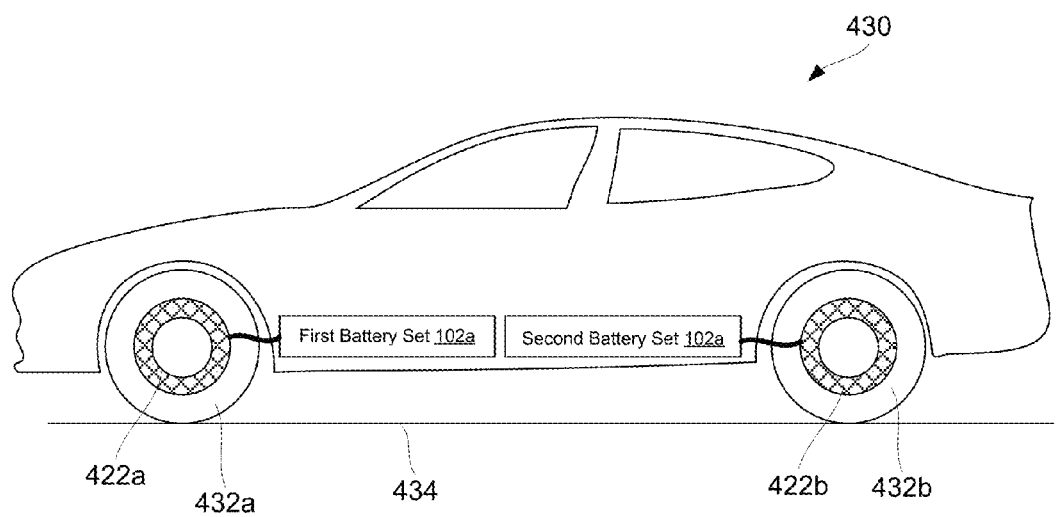

FIG. 4D is a schematic representation of vehicle including a battery system shown in FIG. 4C, in accordance with some embodiments.

Figure 5B:
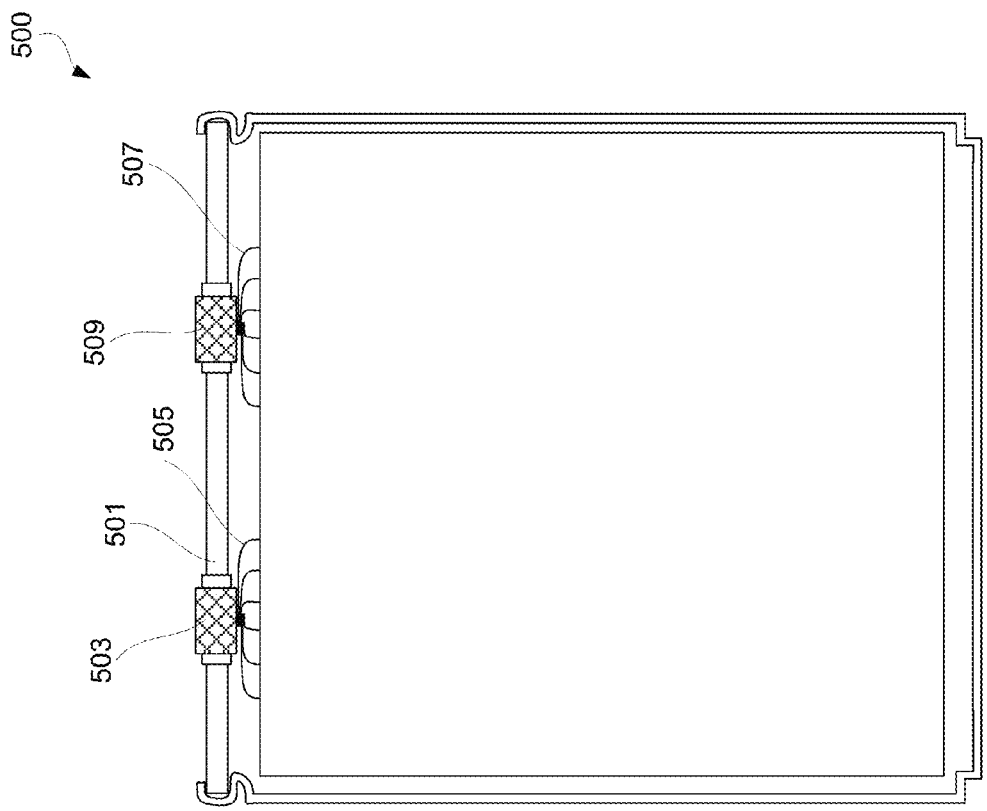
Figure 5A:
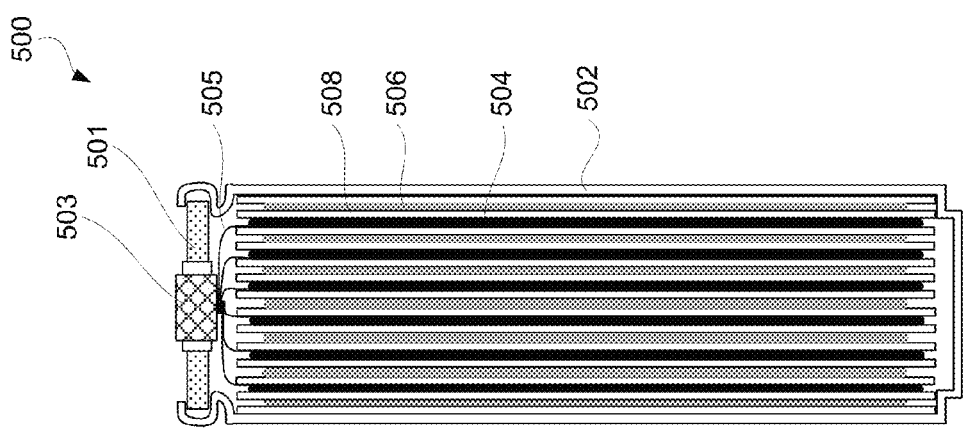

FIGS. 5A and 5B are schematic representations of an battery cell, in accordance with some embodiments.

Any elements and/or components, represented with dashed lines, indicate alternative or optional aspects of the disclosure. Environmental elements, if any, are represented with dotted lines.

DETAILED DESCRIPTION OF EXAMPLE EMBODIMENTS

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph f. In particular, the use of "step of" or "act of" in the Claims herein is not intended to invoke the provisions of 35 U.S.C. 112, Paragraph f.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Conventional battery systems typically use the same type of battery cells throughout the entire system, which compromises many performance characteristics. Furthermore, many of these battery cells have reduced performance at low temperatures, such as at −20° C., which is a possible operating temperature of a vehicle used in a cold climate. Conventional approaches to ensure adequate performance at low temperatures include using oversized battery packs, using cells optimized for power (especially at low temperature) instead of energy, and decreasing the operating/storage temperature range of the vehicle. However, these approaches increase the cost of the vehicle and/or ultimately sacrifice its performance.

Provided are battery systems and method of using these systems to power drive trains of electric and hybrid vehicles, for example. A battery system includes two or more independently controlled sets of battery cells, which may be also referred to as a battery packs. One example of battery system 100 is presented in FIG. 1. Each set can be discharged and/or charged independently of any other set based on different factors, such as the current power demand from a load device, the current power output capability of each set, and other like factors. For example, if the current power demand is greater than the current power output capability of one (first) set (e.g., due to its state of charge, temperature, or other factors), one or more other sets may be discharged (in addition or instead of the first set). One or more sets can be used to deliver power at any given time. Furthermore, one set can be used to charge another set. For example, one set may have battery cells having higher power output capabilities, such as cells having lithium intercalation materials or lithium alloying materials. This set may be referred to as a power set. Another set may have battery cells with higher energy density, such as cells having conversion chemistry materials. This set may be referred to as an energy set. The energy set may be used to charge the power set when the power demand from a load device allows performing this cross-charging. In some embodiments, the energy set is discharged first if its power output capability is sufficient to meet the current power demand. In this case, the power set may be used when the power from the energy set is not sufficient. For example, the power set may be discharged together with the energy set or instead of the energy set. The energy density capacity of the energy set may be higher than that of the power set.

The same or different types of battery cells may be used in different sets. For example, the battery cells of the power set may include a lithium intercalation material or a lithium alloying material. The power set may also include a liquid electrolyte or a gel electrolyte. The power set may also include a carbon anode or a lithium metal anode. Without being restricted to any particular theory, it is believed that a battery cell with a liquid electrolyte generally has a higher power output capability than a similar battery cell with a solid electrolyte because of a generally higher ionic mobility of liquid electrolytes than solid electrolytes. At the same time, the battery cell with the solid electrolyte may be designed to have a higher energy density (than the similar cell with the liquid electrolyte) by using various electrode active materials, which may be not suitable for the liquid electrolyte cell. Some of these materials include lithium metal, which is generally unsuitable for secondary batteries with liquid electrolytes. In some embodiments, the power set may include one or more cells containing $LiFePO_4$ in their positive electrodes. In some other embodiments, the power set may include one or more cells containing $Li(Ni_xMn_yCo_z)O_2$ in their positive electrodes. In some other embodiments, the power set may include one or more cells containing $Li(Ni_xCo_yAl_z)O_2$ in their positive electrodes. In some other embodiments, the power set may include one or more cells containing $LiCoO_2$ in their positive electrodes.

In some embodiments, the power set may include one or more cells containing a lithium rich nickel manganese cobalt oxide. Other examples of active materials suitable for energy cells are described below.

The battery cells of the energy set may include a conversion chemistry material, such as $FeF_2$, $FeO_dF_{3-2d}$ (where $0 \le d \le 0.5$), $FeF_3$, $CoF_3$, $CoF_2$, $CuF_2$, $NiF_2$, or combinations thereof. Other examples of active materials suitable for power cells are described below. These cells may also include a solid electrolyte as further described below. These cells may also include a gel (e.g., U.S. Pat. No. 5,296,318) electrolyte as further described below. These cells may also include a liquid electrolyte as further described below. In some embodiments, the energy set may include one or more cells containing $FeF_3$ on their positive electrodes. In the same embodiments, the power set may include one or more cells containing a lithium rich nickel manganese cobalt oxide. Various examples of lithium rich nickel manganese cobalt oxides are presented below. In some embodiments, the energy set may include one or more cells containing $NiF_2$. In some embodiments, the energy set may include one or more cells containing $FeF_2$. In some embodiments, the energy set may include one or more cells containing $FeF_3$.

In some embodiments, a battery system includes a DC-DC converter, such as a boost converter and/or a buck converter. In some embodiments, a separate converter may be connected to each set to ensure a stable voltage output from this set. In some embodiments, the converter may be connected between different sets of battery cells to allow cross-charging between the two sets.

In some embodiments, a battery system is operable to provide a total power output of at least about 30 kW at a temperature of −20° C. or less. These conditions may be referred to as a cold start. It should be noted that the total power output may be provided by only one set of battery cells or multiple sets, depending on the power output capabilities of the sets in the system. In the same or other embodiments, the battery system is operable to provide a total power output of at least about 300 kW for at least about 10 seconds every 60 seconds. Furthermore, the battery system may be operable to provide a continuous total power output of at least about 10, 20, 50, or 100 kW, which may be at a temperature of about 10° C. for about 2-3 minutes. In some embodiments, the peak power output of the battery system is not less than about 30 kW to ensure minimum performance capability.

In some embodiments, a total energy of a battery system used for powering a vehicle may be between about 0.5 kWh and 500 kWh, such as between about 50 kWh and 150 kWh, between about 80 kWh and 120 kWh, between about 50 kWh and 200 kWh, between about 10 kWh and 90 kWh, between about 50 kWh and 100 kWh, and between about 50 kWh and 120 kWh. The power set may provide between about 2 kWh and 100 kWh of energy or, more specifically, between about 4 kWh and 80 kWh, such as between about 5 kWh and 50 kWh, between about 50 kWh and 200 kWh, between about 10 kWh and 90 kWh, between about 5 kWh and 100 kWh, and between about 50 kWh and 120 kWh. In some embodiments, the energy provided by the power set may represented between about 1% and 50% of the total energy or, more specifically, between about 2% and 40%, between about 5% and 30%, between about 10% and 20%, between about 50% and 100%, between about 50% and 90%, an d between about 50% and 90%. The energy set may provide between about 40 kWh and 200 kWh of energy or, more specifically, between about 50 kWh and 150 kWh, between about 50 kWh and 200 kWh, between about 50 kWh and 200 kWh, between about 20 kWh and 100 kWh, and between about 10 kWh and 90 kWh.

In general, the design the battery system and each set of battery cells in the battery system depends on the application of the system and associated requirements. For example, in a vehicle application, a space available for the entire battery system may have a volume of between about 10 liters and 500 liters or, more specifically, between about 75 liters and 250 liters, between about 100 liters and 200 liters. The distribution of this volume or, more specifically, of the volume allocated to the sets of battery cells may be based on the relative energy densities of the sets as well as based on the ratio of the energies as presented above. In some embodiments, a ratio of the volume occupied by the power set relative to the volume occupied by the energy set may be between about 1 and 10 or, more specifically, between about 1.25 and 5 or between about 2.5 and 4.

It should be noted that the above characteristics of the battery system may met at various conditions, such as different overall states of charge. It should be also noted that some overall state of charge (greater than 0% SOC and less than 100%) may often be achieved by different combinations of states of charges of individual sets of battery cells in this system. For example, 30 kW of continuous power may need to be provided at 20% of the overall state of charge (for the entire system) with a starting temperature of −20° C. This condition may be hard to meet with a conventional battery system, in which all cells have the same state of charge (i.e., 20% in the above example). However, a battery system may keep its power set at a higher state of charge than its energy set (e.g., by discharging the energy set first, cross-charging, and/or recharging the power set when the power is generated). In this case, the power set may be relied on primarily and even exclusively to meet the 30 kW of continuous power requirement. While the power system as a whole may be at 20% state of charge, the power set may have a higher state of charge and, in some embodiments, may be fully charged (i.e., the state of charge of 100%). Furthermore, approximately 270 kW peak power may be needed after an approximate 3-minute warm up time, while the cells are brought to approximately 0° C. Depending on the temperature sensitivities of battery cells in the power and energy sets, one or both of these sets may be used to meet this peak power demand.

In some embodiments, the overall volumetric energy density of the battery system is at least about 200 Wh/L or, more specifically, at least about 400 Wh/L, at least about 500 Wh/L and even at least about 600 Wh/L. This overall volumetric energy density is based on the volume of all cells in the battery system (in all sets) and does not account for the volume of other components of the battery system, such as interconnecting cables, inverters, converters, controllers, heaters. As such, the volumetric energy density is calculated using the energy capacity divided by the total as-installed battery cell volume.

In some embodiments, the total energy capacity of a battery system is at least about 25 kWh or, more specifically, at least about 40 kWh, or at least about 50 kWh, or even at least about 100 kWh. The total energy capacity is measured at a typical operating condition, such as but not limited to, 20 kW discharge power at ambient temperature of 25 C. In some embodiments, the minimum peak charge current capability at the operating temperature ($T_{OP}$) for any state of charge (0-100% SOC) for a 10 s pulse (duration) may be at least about 50 Amperes or, more specifically, at least about 100 Amps, such as at least about 150 Amperes and even at least about 200 Amperes. In the same or other embodiments, the minimum peak discharge current capability at the operating temperature ($T_{OP}$) for any state of charge (0-100% SOC) for a 10 s pulse (duration) may be at least about 50 Amperes or, more specifically, at least about 100 Amperes, such as at least about 150 Amperes and even at least about 1000 Amperes.

In some embodiments, the minimum continuous charge current capability at the operating temperature ($T_{OP}$) for any state of charge (0-100% SOC) may be at least about 25 Amperes or, more specifically, at least about 75 Amperes, such as at least about 100 Amperes and even at least about 150 Amperes. In some embodiments, the minimum continuous discharge current capability at the operating temperature ($T_{OP}$) for any state of charge (0-100% SOC) may be at least about 25 Amperes or, more specifically, at least about 75 Amperes, such as at least about 100 Amperes and even at least about 150 Amperes.

In some embodiments, the overall discharge current provided by the battery system is up to 1200 Amperes. The overall operating voltage of the battery system may be between about 210 Volts and 650V or, more specifically, between 210 Volts and 420 Volts.

As used herein, a "battery system" refers to a battery system having at least two sets of battery cells, such that each of these sets is independently operated and controlled. For example, one set may be discharged without discharging another set. As such, different sets of the same battery system may have different states of charges at the same time. Furthermore, different sets may have different types of battery cells. Different sets provided in the same battery system may have different characteristics, such as different power output capabilities and/or different energy densities.

As used herein, a "set of battery cells" refers to a set of one or more battery cells. If a set include multiple battery cells, then these battery cells may be interconnected in accordance to one of many possible connection schemes, such as in series, parallel, or various combinations of in series and parallel connections. The same type of battery cells may be used in one set. However, different sets may have different types of battery cells as noted above. All batteries of the same set may be grouped together or mixed with batteries of another set (e.g., for heat distribution). Furthermore, battery cells of different sets may share the same enclosure.

As used herein, "power output capability" refers to an ability of a set to provide electrical power during a discharge. The power output capability of a set may vary with its state of charge (becomes lower as the battery cells within the set discharge), temperature (becomes higher as the battery cells within the set heat up). "Average power output capability" refers to an average level of the power output capability profile for all states of charge and a given operating temperature.

As used herein "conversion chemistry material" refers to a material that undergoes a chemical reaction during the charging and discharging cycles of a secondary battery. Conversion chemistry materials useful in the present invention include, but are not limited to, LiF, Fe, Cu, Ni, $FeF_2$, $FeO_dF_{3-2d}$, $FeF_3$, $CoF_3$, $CoF_2$, $CuF_2$, $NiF_2$, where $0 \leq d \leq 0.5$, and the like. Exemplary conversion chemistry materials are found, for example, in U.S. Patent Publication No. 2014/0117291, filed Oct. 25, 2013, and entitled METAL FLUORIDE COMPOSITIONS FOR SELF FORMED BATTERIES, and in U.S. Patent Publication No. 2016/0049655 A1, filed Aug. 15, 2015, entitled DOPED CONVERSION MATERIALS FOR SECONDARY BATTERY CATHODES, all of which are incorporated by reference herein in their entirety. Exemplary conversion chemistry materials are found, for example, in U.S. Patent Publication No. 2014/0170493, entitled NANOSTRUCTURED MATERIALS FOR ELECTROCHEMICAL CONVERSION REACTIONS, and filed Jun. 19, 2013, and U.S. patent application Ser. No. 14/827,105, filed Aug. 14, 2015, titled CATHODE WITH NANOCOMPOSITE PARTICLE OF CONVERSION CHEMISTRY MATERIAL AND MIXED ELECTRONIC IONIC CONDUCTOR, the contents of each of which are incorporated by reference in their entirety.

As used herein, the term "electrolyte," refers to an ionically conductive and electrically insulating material. Solid electrolytes, in particular, rely on ion hopping through rigid structures. Solid electrolytes may be also referred to as fast ion conductors or super-ionic conductors. Solid electrolytes may be also used for electrically insulating the positive and negative electrodes of a cell while allowing for the conduction of ions, e.g., $Li^+$, through the electrolyte. In this case, a solid electrolyte layer may be also referred to as a solid electrolyte separator.

Solid electrolytes provide various advantages in comparison with conventionally used liquid electrolytes. Specifically, the use of solid electrolytes may improve safety, eliminate the need for physical separators (e.g., those required for liquid electrolyte secondary batteries such as a porous, but electronically insulating polyolefin separators or biaxially stretched, non-woven polyethylene film separators). The use of solid electrolytes permits the use of lithium metal as the negative electrode without intercalation or alloying mediums in the negative electrode. The use of solid electrolytes reduces irreversible lithium loss on electrodes and allows for the use of high capacity active materials in a liquid phase (rather than insertion hosts). In general, solid electrolytes have beneficial chemical and physical stability, perform well as thin films (of about 100 micrometer and even less), and may be configured to selectively conduct particular ions while excluding electron conduction.

Various solid electrolyte compositions have been tried in the past with different levels of success. One example includes lithium super ionic conductor (LISICON), which includes a family of solids with the chemical formula $Li_{2+2x}Zn_{1-x}GeO_4$. Other examples include $Li_2S$—$SiS_2$—$Li_3PO_4$ (glass electrolyte), $Li_{10}GeP_2S_{12}$, Li-β-alumina, $Li_2S$—$P_2S_5$ (glass electrolyte), $Li_{3.25}Ge_{0.25}P_{0.75}S_4$, $Li_7P_3S_{11}$, lithium phosphorus oxynitride (LiPON), and various polymer based electrolytes, just to name a few. While polymer based electrolytes have wide adoption, inorganic solid electrolytes provide benefits of single cation conduction, wide electrochemical window, and simple electrochemical reactions. Anolytes, as set forth herein, also provide benefits such as, but not limited to, preventing lithium dendrite formation during operation (charge and discharging) of a rechargeable battery cell (e.g., secondary battery). Sulfide-containing solid electrolytes further standout amount other types of inorganic solid electrolytes because of their high ionic conductivity (e.g., greater than $10^{-3}$ S/cm for $Li^+$), controlled grain-boundary resistance, wide selection of composites, and ease or production (e.g., precipitation of super-ionic metastable crystalline phases from glass). In fact, lithium ion conductivity of some sulfide-containing solid electrolytes is often greater than that of conventional liquid electrolytes while retaining all benefits of solid electrolytes listed above.

Some examples of sulfide based solid electrolyte include evaporated lithium phosphorous sulfide or, generally, lithium phosphorous sulfide (LPS), evaporated lithium silicon sulfide or, generally, lithium silicon sulfide (LSS), evaporated lithium antimony tin sulfide or, generally, lithium antimony tin sulfide (LATS), evaporated lithium silicon tin phosphorous sulfide or, generally, lithium silicon tin phosphorous sulfide (LSTPS), evaporated lithium tin sulfide or, generally, tin sulfide (LTS), evaporated lithium arsenic tin sulfide or, generally, lithium arsenic tin sulfide (LATS), evaporated lithium germanium phosphorous sulfide or, generally, lithium germanium phosphorous sulfide (LGPS), evaporated lithium phosphorous sulfide doped with oxygen or, generally, lithium phosphorous sulfide doped with oxygen (LPSO), evaporated lithium silicon tin phosphorous sulfide doped with oxygen or, generally, lithium silicon tin phosphorous sulfide doped with oxygen (LSTPSO), and a polymer-sulfide composite. Specifically, the sulfur-containing layer may include evaporated lithium phosphorous sulfide or, generally, and/or lithium phosphorous sulfide (LPS). In the same or other embodiments, the sulfur-containing layer may include evaporated lithium phosphorous sulfide doped with oxygen or, generally, lithium phosphorous sulfide doped with oxygen (LPSO). Suitable polymers for a polymer-sulfide composite include polypropylene, polyethylene oxide (PEO), polyethylene oxide poly(allyl glycidyl ether) PEO-AGE, PEO-MEEGE, polyethylene oxide 2-Methoxyethoxy)ethyl glycidyl poly (allyl glycidyl ether) PEO-MEEGE-AGE, polysiloxane, polyvinylidene fluoride (PVdF), polyvinylidene fluoride hexafluoropropylene (PVdF-HFP), and rubbers such as ethylene propylene (EPR), nitrile butadiene rubber (NBR) and Styrene-Butadiene-Rubber (SBR). Specifically, the sulfur-containing layer may include evaporated lithium phosphorous sulfide and/or lithium phosphorous sulfide (LPS).

Examples of electrolytes that do not contain sulfides include, for example, ceramic based electrolytes, such as but not limited to Li-stuffed garnet electrolytes. As used herein, "Li-stuffed garnet" refers to oxides that are characterized by a crystal structure related to a garnet crystal structure. Li-stuffed garnets include compounds having the formula $Li_aLa_bM'_cM''_dZr_eO_f$, $Li_aLa_bM'_cM''_dTa_eO_f$, or $Li_aLa_bM'_cM''_dNb_eO_f$, where $4<a<8.5$, $1.5<b<4$, $0\leq c\leq 2$, $0\leq d\leq 2$; $0\leq e<2$, $10<f<13$, and M' and M'' are, independently in each instance, selected from Al, Mo, W, Nb, Sb, Ca, Ba, Sr, Ce, Hf, Rb, or Ta, or $Li_aLa_bZr_cAl_dMe''_eO_f$, where $5<a<7.7$, $2<b<4$, $0<c\leq 2.5$, $0<d\leq 2$, $0\leq e<2$, $10<f<13$ and Me'' is a metal selected from Nb, Ta, V, W, Mo, or Sb and as described herein. "Garnets," as used herein, also include those garnets described above that are doped with $Al_2O_3$. Garnets, as used herein, also include those garnets described above that are doped so that $Al^{3+}$ substitutes for $Li^+$. As used herein, Li-stuffed garnets, and garnets, generally, include, but are not limited to, $Li_{7.0}La_3(Zr_{t1}+Nb_{t2}+Ta_{t3})O_{12}+0.35Al_2O_3$, where (t1+t2+t3=subscript 2) so that the La:(Zr/Nb/Ta) ratio is 3:2. Also, garnet and lithium-stuffed garnets as used herein can include $Li_xLa_3Zr_2O_{12}+yAl_2O_3$, where x ranges from 5.5 to 9 and y ranges from 0 to 1. In some embodiments, x is 7 and y is 1.0. In some embodiments, x is 7 and y is 0.35. In some embodiments, x is 7 and y is 0.7. In some embodiments x is 7 and y is 0.4. Also, garnets as used herein can include $Li_xLa_3Zr_2O_{12}+yAl_2O_3$. Exemplary lithium-stuffed garnets are found in the compositions set forth in International Patent Application Publication Nos. WO 2015/054320 and WO 2015/076944, filed Oct. 7, 2014, entitled GARNET MATERIALS FOR LI SECONDARY BATTERIES AND METHODS OF MAKING AND USING GARNET MATERIALS.

In some embodiments, a layered material for an electrochemical device includes at least one layer including an anode and an anode current collector, at least one layer comprising a garnet solid state electrolyte (SSE), and at least one layer comprising a porous garnet in contact with the garnet SSE. The porous garnet is optionally infiltrated with at least one of carbon, a lithium conducting polymer, an active cathode material, or combinations thereof. At least one layer may include an cathode current collector in contact with the porous garnet. The porous garnet layer may be at least 30% by volume garnet. The garnet may be a material selected from the group consisting of: $Li_4La_BM'_CM''_DZr_EO_F$, $Li_4La_BM'_CM''_DTa_EO_F$, $Li_4La_BM'_CM''_DNb_EO_F$, wherein $4<A<8.5$, $1.5<B<4$, $0\leq C\leq 2$, $0\leq D\leq 2$; $0\leq E<2$, $10<F\leq 13$, and M' and M'' are each, independently in each instance selected from Al, Mo, W, Nb, Sb, Ca, Ba, Sr, Ce, Hf, Rb, or Ta, and $Li_aLa_bZr_cAl_dMe''_eO_f$, wherein $5<a<7.7$; $2<b<4$; $0<c\leq 2.5$; $0\leq d<2$; $0\leq e<2$, $10<f\leq 13$ and Me'' is a metal selected from Nb, Ta, V, W, Mo, or Sb; and wherein the active electrode material is a cathode material selected from NCA (lithium nickel cobalt aluminum oxide), LMNO (lithium manganese nickel oxide), LCO (lithium cobalt oxide, i.e., $LiCoO_2$), NMC, nickel fluoride ($NiF_x$, wherein x is from 0 to 2.5), copper fluoride ($CuF_y$, wherein y is from 0 to 2.5), or $FeF_z$ (wherein z is selected from 0 to 3.5).

In some embodiments, the SSE is in contact with the anode. Alternatively, the SSE may contact an anolyte interlayer, such that the anolyte interlayer contacts the anode layer. The anolyte interlayer may include one or more of lithium silicates, lithium borates, lithium aluminates, lithium phosphates, lithium phosphorus oxynitrides, lithium silicosulfides, lithium borosulfides, lithium aluminosulfides, and lithium phosphosulfides, lithium sulfides, lithium phosphides, lithium nitrides, lithium oxides, lithium halides. In some embodiments, the anolyte interlayer is selected from the group consisting of: $LiI—Li_3PO_4—P_2O_5$, $B_2O_3—LiCO_3—Li_3PO_4$, $LiI—Li_2O—SiO_2$, $LiI$, $LiF$, $LiBr$, $LiCl$, $Li_2WO_4$, $LiSO_4$, $LiIO_3$, $Li_4SiO_4$, $Li_2Si_2O_5$, $LiAlSiO_4$, $Li_4(Si_{0.7}Ge_{0.3})O_4$, $Li_4GeO_4$, $LiAlCl_4$, $Li_3PO_4$, $Li_3N$, $Li_2S$, $Li_3P$, $Li_2O$, $Li_5AlO_4$, $Li_5GaO_4$, $Li_6ZnO_4$, $LiAr_2(PO_4)_3$, $LiNS_2$, $LiMgF$, $LiAlMgF_4$, $Li_2S—P_2S_5$, $LiI—Li_2S—P_2S_5$, and $Li_2S—GeS_2—P_2S_5$. Additional description and examples of lithium-rich nickel manganese cobalt oxides are presented in International PCT Patent Application No. PCT/US2015/067387, filed Dec. 22, 2015, which is incorporated herein by reference in their entireties for purposes of describing lithium-rich nickel manganese cobalt oxides.

Various types of battery cells may be used in battery systems described herein. In some embodiments, only one type of battery cells may be used for the entire battery system. These cells are still divided into two or more independently controlled sets, which are, e.g., discharged independently from each other. Alternatively, a battery system may include two or more types of cells. For example, each set of this system may include a different type of battery cells. In some embodiments, at least one set in a battery system includes one or more battery cells having an intercalation material or an alloying material on electrodes of the cells. Specific examples of intercalation materials include various lithium-rich nickel manganese cobalt oxides. In some embodiments, these oxides may be characterized by the following formula: $Li_{1+x}Ni_yMn_wCo_zO_{2+(x/2)}$, where: $0 \le x \le 0.25$; $0.5 \le y \le 0.65$; $0.1 \le w \le 0.5$; $0.05 \le z \le 0.5$; and $y+w+z=1$. More specifically, w may be equal to z (i.e., =z). In some examples, $y>w$ and $y>z$. Furthermore, y may be greater than the sum of w and z (i.e., $y>w+z$). In some examples, $y>w$ and/or $y>z$.

In these oxides, some Li may occupy Ni, Mn, or Co crystal lattice positions. More specifically, some amount of Li may occupy Ni crystal lattice positions. The amount of the Li in these positions may range from 0.1 to 15 mol %. The material formed from these oxides may be a layered-layered oxide. For example, the material may include at least two polycrystalline layered oxide phases, which may be inter-grown phases. In some embodiments, the material includes a third polycrystalline inter-growth layered oxide. One of the at least two crystalline layered oxide phases may be $Li_2M_1O_3$, where $M_1$ is selected from Ni, Mn, or Co. $Li_2M_1O_3$ may be isostructural to $Na_2MnO_3$ and has C2/m symmetry. In some embodiments, one of the at least two crystalline layered oxide phases is $Li_{1+x}M_2O_2$ where $M_2$ is selected from Ni, Mn, or Co. $Li_{1+x}M_2O_2$ may be isostructural to $NaFeO_2$ and has R3m symmetry. The third polycrystalline inter-growth layered oxide is selected from a low voltage stability phase, such as a spinel phase. In some embodiments, the material may be characterized as a two-phase mixture of $aLi_2M_1O_3$ and $(1-a)Li_{1+x}M_2O_2$, where: $0 \le a \le 0.3$; "a" is the relative mole fraction of $Li_2M_1O_3$; $0 \le x \le 0.1$; and "x" is the mole fraction of excess lithium in the material characterized by the formula $Li_{1+x}M_2O_2$. The material may also include a dopant such as Al, Fe, Mg, Na, V, Cr, Ti, Zr and combinations thereof. For example, the dopant may be Al at a concentration of about 0.1 to about 5 mol %. Alternatively, the dopant may be Fe at a concentration of about 0.1 to about 5 mol %. Furthermore, the dopant is a combination of Al and Fe at a total dopant concentration of about 5 mol %.

In some embodiments, the lithium-rich nickel manganese cobalt oxides is polycrystalline and characterized by a first X-ray diffraction (XRD) pattern intensity {003} peak at 19° (2θ) and a second XRD pattern intensity {101} peak at 38-39° (2θ), and where the ratio of the first peak to the second peak is equal to or greater than 1 or, more specifically, greater than 1.5 and even greater than 2.0.

In some embodiments, the unit cell of $Li_{1+x}M_2O_2$ is characterized by a unit cell volume ranging from 95 to 120 $Å^3$ or, more specifically, from 102 to 103 $Å^3$. The value of x (in $Li_{1+x}M_2O_2$) may be about 0.25. The specific capacity of this material may be at least 212 mAh/g and C/10 rate. The specific energy density may be at least 725 Wh/kg and 825 Wh/kg at 1 C and C/10 rate, respectively. The material may have a crystalline phase with a grain size from about 50 nm to about 500 nm, such as about 200 nm.

Some specific examples of lithium-rich nickel manganese cobalt oxides include $Li_{1+x}Ni_{0.5}Mn_{0.25}Co_{0.25}O_2$, $Li_{1+x}Ni_{0.6}Mn_{0.20}Co_{0.20}O_2$, $Li_{1+x}Ni_{0.475}Mn_{0.475}Co_{0.05}O_2$, $Li_{1+x}Ni_{0.45}Mn_{0.45}Co_{0.1}O_2$, and $Li_{1+x}Ni_{0.55}Mn_{0.4}Co_{0.05}O_2$. In some embodiments, the material has a surface coating, such as $AlF_x$ (where $0 \le x \le 3$) $CoPO_4$, $LiFePO_4$, lithium phosphate, lithium hydroxyphosphate, cobalt oxide, alumina, aluminum phosphate, lithium aluminum phosphate, lithium aluminate, aluminum fluoride, titania, titanium phosphate, lithium titanate, lithium niobate, lithium zirconate, and lithiated or delithiated versions of the preceding compounds. The material may be characterized by a tap density of 1-2.5 g/cm$_3$ for a $d_{50}$ particle size distribution from 4 to 30 μm or, more specifically, by the tap density greater than 2 g/cm$^3$ for a $d_{50}$ particle size distribution from 10 to 20 μm.

Additional description and examples of lithium-rich nickel manganese cobalt oxides are presented in International PCT Patent Application No. PCT/US2015/067387, filed Dec. 22, 2015, which is incorporated herein by reference for purposes of describing lithium-rich nickel manganese cobalt oxides.

In some embodiments, the electrode active materials are oxides with empirical formula $Li_xMO_2$, where M is a transition metal selected from Mn, Fe, Co, Ni, Al, Mg, Ti, V, Si of a combination thereof. The value x may be between about 0.01 and about 1, between about 0.5 and about 1, or between about 0.9 and about 1. In some embodiments, an oxide of the active material may include multiple metals in additional to lithium. In some embodiments, the electrode active materials may be represented by the formula $Li_xM1_aM2_bM3_cO_2$, where each of M1, M2, and M3 is different one of Mn, Fe, Co, Ni, Al, Mg, Ti, V or Si. The subscripts a, b and c are each independently a real number between about 0 and 1 ($0 \le a \le 1$; $0 \le b \le 1$; $0 \le c \le 1$; $0.01 \le x \le 1$), with the proviso that a+b+c is about 1. More specifically, the electrode active materials may be represented by the formula $Li_xNi_aCo_bMn_cO_2$, where the subscript x is between about 0.01 and 1 (e.g., x is 1); the subscripts a, b and c are each independently 0, 0.1, 0.2, 0.3, 0.4, 0.5, 0.6, 0.7, 0.9 or 1, with the proviso that a+b+c is 1. In other instances, the subscripts a, b and c are each independently between about 0-0.5, between about 0.1-0.6, between about 0.4-0.7, between about 0.5-0.8, between about 0.5-1 or between about 0.7-1 with the proviso that a+b+c is about 1. Furthermore, the electrode active materials may be represented by the formula $Li_{1+x}M1_yM2_{2-y}O_4$, where M1 and M2 are each independent transition metal selected from Fe, Mn, Co, Ni, Al, Mg, Ti, V, Si, and a combination thereof, with a spinel crystal structure. The value x may be between about −0.11 and 0.33, or between about 0 and about 0.1. The value of y may be between about 0 and 0.33, or between 0 and about 0.1. In one embodiment, A is Ni, x is 0 and y is 0.5 (i.e., the active material is $LiA_{0.5}M_{1.5}O_4$). Some examples of active materials include vanadium oxides such as $LiV_2O_5$, $LiV_6O_{13}$, or the foregoing compounds modified in that the compositions thereof are nonstoichiometric, disordered, amorphous, overlithiated or underlithiated.

In other embodiments, the electrode active materials are oxides such as $LiCoO_2$, spinel $LiMn_2O_4$, chromium-doped spinel lithium manganese oxides $Li_xCr_yMn_2O_4$, layered $LiMnO_2$, $LiNiO_2$, or $LiNi_xCo_{1-x}O_2$, where x is between about 0 and 1, or between about 0.5 and about 0.95. The electrode active materials may also be vanadium oxides such as $LiV_2O_5$, $LiV_6O_{13}$, or the foregoing compounds modified in that the compositions thereof are nonstoichiometric, disordered, amorphous, overlithiated or underlithiated.

In some embodiments, the electrode-active material includes transition metal oxides such as $LiCoO_2$, $LiMn_2O_4$, $LiNiO_2$, $LiNi_xMn_{1-x}O_2$, $LiNi_xCo_yMn_{1-x-y}O_2$ and their derivatives, where x and y are each between about 0 and 1. $LiNi_xMn_{1-x}O_2$ can be prepared by heating a stoichiometric mixture of electrolytic $MnO_2$, LiOH and nickel oxide to between about 300 and 400° C. In certain embodiments, the electrode active materials are $xLi_2MnO_3(1-x)LiMO_2$ or $LiM'PO_4$, where M is selected Ni, Co, Mn, $LiNiO_2$ or $LiNi_xCo_{1-x}O_2$; M' is selected from Fe, Ni, Mn and V; and x and y are each independently a real number between about 0 and 1. $LiNi_xCo_yMn_{1-x-y}O_2$ can be prepared by heating a stoichiometric mixture of electrolytic $MnO_2$, LiOH, nickel oxide and cobalt oxide to between about 300 and 500° C.

The positive electrode may contain conductive additives from 0% to about 90%. In one embodiment, the subscripts x and y are each independently selected from 0.1, 0.15, 0.2, 0.25, 0.3, 0.35, 0.4, 0.45, 0.5, 0.55, 0.6, 0.65, 0.7, 0.75, 0.8, 0.85, 0.9 or 0.95, and x and y can be any numbers between 0 and 1 to satisfy the charge balance of the compounds $LiNi_xMn_{1-x}O_2$ and $LiNi_xCo_yMn_{1-x-y}O_2$.

The suitable positive electrode-active compounds may be further modified by doping with about 5% or less of divalent or trivalent metallic cations such as $Fe^{2+}$, $Ti^{2+}$, $Zn^{2+}$, $Ni^{2+}$, $Co^{2+}$, $Cu^{2+}$, $Mg^{2+}$, $Cr^{3+}$, $Fe^{3+}$, $Al^{3+}$, $Ni^{3+}$ $Co^{3+}$, or $Mn^{3+}$, and the like. In other embodiments, positive electrode active materials suitable for the positive electrode composition include lithium insertion compounds with olivine structure such as $Li_xMXO_4$, where M is a transition metal selected from Fe, Mn, Co, Ni, and a combination thereof, X is a selected from P, V, S, Si and combinations thereof, and the value of the value x is between about 0 and 2. In certain instances, the compound is $LiMXO_4$. In some embodiments, the lithium insertion compounds include $LiMnPO_4$, $LiVPO_4$, $LiCoPO_4$ and the like. In other embodiments, the active materials have NASICON structures such as $Y_xM_2(XO_4)_3$, where Y is Li or Na, or a combination thereof, M is a transition metal ion selected from Fe, V, Nb, Ti, Co, Ni, Al, or the combinations thereof, X is selected from P, S, Si, and combinations thereof, and the value of x is between 0 and 3. In some embodiments, the negative electrode includes graphite, hard carbon, titanate ($Li_4Ti_5O_{12}$), silicon, and/or germanium.

Another example of battery cells that can be used in battery systems include cells with conversion chemistry materials. A brief definition and some examples of conversion chemistry materials are presented above. In some embodiments, a positive electrode film (e.g., a film adhered to a current collector) includes composite particles, a catholyte, and a binder. The composite particles may include a mixed electronic ionic conductor (MEIC) and metal fluoride (MF). The composite particles may also include an electrically conductive additive having carbon. The catholyte and binder contact the composite particle outer surfaces but are not contained therein. The composite particles may be characterized by a porosity of less than about 15% v/v. In some embodiments, the composite particles include an electrically conductive additive (e.g., carbon).

Some examples of MEIC include carbon, $MoS_x$ (where $0<x\leq3$), $MoS_2$, MoS, $LiV_3O_8$, $LiV_3O_6$, MoOF, $MoO_{3-x}$ (where $0\leq x\leq1$), $Li_xVO_y$ (where $0\leq x<2y$ and $1\leq y\leq2.5$), $V_2O_5$, $Mn_aO_b$ (where $1\leq a\leq2$ and $1\leq b\leq7$), MnO, $Mn_3O_4$, $Mn_2O_3$, $MnO_2$, $LiAlCl_4$, LISICON, NASICON, $Na_{1+x}Zr_2Si_xP_{3-x}O_{12}$ (where x in each instance is $0<x<3$ and optionally where Na, Zr and/or Si are replaced by isovalent elements, NASICON-structured phosphates), $Li_cNa_cV_2(PO_4)_3$ (where c in each instance is independently $0<c<1$) $Li_dNa_dM_eM'_f(PO_4)_3$ (where d in each instance is independently $0\leq d\leq2$, and $0\leq e\leq2$, $0\leq f\leq2$, and M and M' are metals selected from the group consisting of V, Nb, Ta, Cr, Fe, Al, Co, Ni, and Cu, $Li_gMM'(SO_4)_3$ where M and M' are transition metals and g is selected so that the compound is charge neutral), and $LiMXO_4$ (where X is Ge, Si, Sb, As, or P), $Li_bN_aV_2(PO_4)_3$, $Li_bNa_2FeV(PO_4)_3$, $Li_hFeTi(PO_4)_3$, and $Li_hTiNb(PO_4)_3$, $Li_hFeNb(PO_4)_3$ (where $0\leq h\leq1$). Other examples of MEICs include $MoO_{3-x}$ where $0\leq x\leq1$, $MoOF_4$, $FeMoO_2$, $FeMoO_4$, $MoS_2$, MoS, $VO_y$ where $1\leq y\leq2.5$, $LiV_3O_8$, $LiV_3O_6$, $VOF_3$, fluorinated vanadium oxide, fluorinated molybdenum oxide, and MoOF, $MoOF_4$, $VOF_3$.

In some embodiments, the MEIC is coated on the MF. The MEIC and MF may be nano-dimensional. More specifically, the MEIC and MF may be nano-dimensioned and substantially homogenous within a volume of 1000 $nm^3$. The MEIC may have a charge and/or discharge voltage window that overlaps that of the MF. In some embodiments, the MEIC has a discharge voltage of between about 1.8 to 4 V v. Li or between about 2 to 2.5 V v. Li or between about 3 to 3.5 V v. Li.

Some examples of the MF include LiF, $Li_zFeF_3$, $Li_zCuF_2$, $Li_zNiF_2$, $Li_zNiF_{2.5}$, $Li_zNiF_3$, $Li_zCoF_2$, $Li_zCoF_3$, 3 $Li_zMnF_2$, and $Li_zMnF_3$ (where $0\leq z\leq3$). For example, the MF may be $Li_dMF_g$, wherein d and g are, independently in each instance, selected from within the range of 0 to 3. M (in $Li_dMF_g$) may be a metal selected from Fe, Cu, Ni, Co, Mn, alloys thereof, or combinations thereof. In some embodiments, the MF is nano-dimensioned. The MF may be in the form of nano-domains. In some embodiments, the MF is doped with a dopant, such as oxygen, carbon, a metal (e.g., Li, Mg, Al, Si, Ca, Ti, V, Cr, Mn, Fe, Co, Ni, Cu, Zn, Y, Zr, Nb, Ba, and Hf), a 4 metal oxide of said metal, a cation of said metal, a metal fluoride of said metal, and combinations thereof. The dopant may be one of $Li_2O$, Cu, $CuF_2$, $NiF_2$, $ZrF_4$, $CaF_2$, or $AlF_3$. In some embodiments, the MF is LiF and also includes a nano-dimensioned metal, such as Fe, Co, Mn, Cu, Ni, Zr, and combinations thereof.

In some embodiments, the electrically conductive material includes carbon, such as activated carbon, carbon black, carbon fibers, carbon nanotubes, carbon nanofibers, graphite, graphene, fullerenes, ketjen black, vapor grown carbon fiber (VGCF), and acetylene black. Examples of the catholyte include LSS, LTS, LXTS, LXPS, LXPSO, and Li-stuffed garnet (where X is Si, Ge, Sn, As, Al, or combinations thereof). Specifically, the catholyte may be LXPS and it may be substantially free of oxygen (where X is Si, Ge, Sn, Al, or combinations thereof). The catholyte may be LXPS and may have an oxygen content between about 0 and 10 atomic % (where X is Si, Ge, Sn, As, Al, or combinations thereof).

Some examples of the binder include polypropylene (PP), atactic polypropylene (aPP), isotactive polypropylene (iPP), ethylene propylene rubber (EPR), ethylene pentene copolymer (EPC), polyisobutylene (PIB), styrene butadiene rubber (SBR), polyolefins, polyethylene-co-poly-1-octene (PE-co-PO), PE-co-poly(methylene cyclopentane) (PE-co-PMCP), stereoblock polypropylenes, polypropylene polymethylpentene copolymer, polyethylene oxide (PEO), polysiloxanes, and silicone. The film may be characterized by a thickness of about 1 to 100 μm, such as 40 μm, 50 μm, 60 μm, 70 μm, or 80 μm. In some embodiments, the thickness may be about 10 to 60 μm, about 20 to 80 μm, or about 10 to 15 μm. In some embodiments, the composite particles each have a median characteristic dimension that is 0.04 to 1.5 times the thickness of the film. The composite particles may have a diameter of about 0.5 μm to about 10 μm, while the film may have a thickness of about 30-90 μm. More specifically, the composite particles may have a diameter of about 3 μm to about 7 μm, while the film may have a thickness of about 50-70 μm. In some embodiments, the composite particles are characterized by a median diameter ($d_{50}$) of about 0.1 to 15 μm or about 3 to 7 μm. The MF may be characterized by a median diameter ($d_{50}$) of about 5 nm to 5 μm, 1-5 nm, 1-10 nm, or 5-10 nm.

In some embodiments, the weight ratio of MEIC to MF in the composite particles is between about 8:92 to 17:83 w/w or between about 1:99 to 15:85 w/w or 3:97 w/w, or 1:99 w/w. The volume percent of the MEIC and MF, the catholyte, the binder, and the electrically conductive additive in the film is about 25-85, 25-85, 1-6, and 1-6% v/v, respectively. The composite is a micron sized particle having a median physical dimension of about the thickness of the film in which the composite is located.

Additional description and examples of positive electrode films and conversion chemistry materials that would be used in such films are presented in U.S. patent application Ser. No. 14/827,105, filed Aug. 14, 2015, titled CATHODE WITH NANOCOMPOSITE PARTICLE OF CONVERSION CHEMISTRY MATERIAL AND MIXED ELECTRONIC IONIC CONDUCTOR, which is incorporated herein by reference for purposes of describing lithium-rich nickel manganese cobalt oxides.

Many battery cells experience some loss in power output capabilities as these cells get discharged. FIG. 2A is an illustrative representation of discharge profile 200 for a battery cell covering a fully charge state (identified as 100%) and various partial discharged states (identified as 75%, 50% and 25%). One having ordinary skill in the art would understand that a discharge profile depends on the type of a battery cell (e.g., composition and structure of electrodes), discharge conditions (e.g., cutoff potentials, discharge rates), operating conditions (e.g., temperature), operating lifetime (e.g., number and severity of previous cycles), and many other factors. Examples of some factors impacting the discharge profile and power output capabilities are described in other parts of this disclosure. Discharge profile 200 presented in FIG. 2A is used for illustrative purposes only and should not be treated as limiting to any examples of battery systems described herein unless some features of the illustrative discharge profile are specifically recited in the claims.

When a battery cell is fully charged (e.g., the state of charge of about 100%), the cell can be provide a higher electrical power output than when the battery is partially discharged. This phenomenon is attributed to the discharge potential drop as the battery cell is being discharged and is known. To better understand various features of a sequential discharge process, discharge profile 200 shown in FIG. 2A is conceptually divided into higher power zone 202 and lower power zone 204. The same battery cell has a higher power output capability in its higher power zone 202 than in its lower power zone 204. One reason is a higher discharge potential in higher power zone 202 than in lower power zone 204 as show in FIG. 2A. An illustrative example of output capabilities at different state of charges for $LiFePO_4$ and $FeF_3$ cells (operating at 25° C. and 80° C. respectively) is presented in the table 1 below.

TABLE 1

| State of Charge | Battery Cell Type 1 (e.g., $LiFePO_4$ at 25° C.) | | Battery Cell Type 2 (e.g., $FeF_3$ at 80° C.) | |
|---|---|---|---|---|
| | Power Output Capability | Discharge Voltage | Power Output Capability | Discharge Voltage |
| Fully Charged (e.g., 100%) | 600 W | 2.0 V | 510 W | 1.7 V |
| Intermediate State 1 (e.g., 75%) | 515 W | 2.0 V | 510 W | 1.7 V |
| Intermediate State 2 (e.g., 50%) | 510 W | 2.0 V | 305 W | 1.7 V |
| Intermediate State 3 (e.g., 25%) | 440 W | 2.0 V | 295 W | 1.7 V |
| Fully Discharged (e.g., 0%)/Cut Off | 0 W | 2.0 V | 0 W | 1.7 V |

The battery cell is still capable to provide some power while it is in lower power zone 204 even though this power is less than the power available in higher power zone 202. A simple example may help to better illustrate this point. An electrical vehicle may use a battery cell having a discharge profile similar to the one presented in FIG. 2A. For simplicity, only two different power demands are considered, i.e., a higher power demand (e.g., associated with acceleration of the vehicle) and a lower power demand (e.g., associated with cruising of the vehicle). When the battery cell is sufficiently charged (e.g., when it is in higher power zone 202), the battery cell can provide enough power to meet either the higher power demand or the lower power demand. However, when the battery cell is discharged below a certain level (e.g., when it drops to lower power zone 204), the battery cell may still be able provide enough power to meet the lower power demand but not the higher power demand. In other words, the battery power may be still sufficient to maintain the cruising speed of the vehicle, but not to accelerate. A conventional battery pack includes multiple battery cells. However, all battery cells in the same pack are charged and discharged together and, therefore, maintained at generally the same state of charge at any particular time. As such, the battery pack also has the same power output profile as individual cells. Conventional approaches to prolong the power output capabilities is to design battery cells with have relatively flat discharge profiles (e.g., to stay in the higher power zone for as long as possible) and/or to use more battery cells (e.g., to maintain a certain threshold state of charge for longer time). However, many cells with flat discharge profiles also have low energy densities and can be expensive. Packing more battery cells or using larger cells is not desirable from the cost, size, and weight perspectives.

Methods and systems described herein utilize at least two sets of battery cells. These sets are discharged independently such that one set may have a higher state of charge than another set in the same battery system. A set with a lower power output capability may be discharged first if its capability meets the power demand. A set with a higher power output capability may be used only when the power demand is not met by the other set. This allows to have higher power output capabilities for longer operating time than many conventional approaches. Specifically, when a conventional battery pack includes multiple battery cells, these battery cells are typically discharged and charged together, as a whole. In other words, all cells in the same conventional battery pack generally have the same state of charge at any given time. Maintaining all cells at the same state of charge is generally cheaper and simpler, and requires fewer components in a battery pack. On other hand, the described methods and systems discharge two or more sets of battery cells independently from each other such that these sets may have different states of charge. For example, one set of battery cells may be discharged first (i.e., a first set), while another set (i.e., a second set) may maintain its state of charge and not discharged. The second set may be discharged at some later time, e.g., when a higher power output is needed and cannot be provided by the pack that started being discharged first. In this example, the first set may be referred to as a power set, while the second set may be referred to as an energy set. The sequential discharge will now be described in more details and compared to the conventional uniform discharge with reference to FIG. 2B.

FIG. 2B illustrates power capabilities of two battery systems operated using different discharge processes, in accordance with some embodiments. Both battery systems may be the same and include the same number of cells. For simplicity, each battery system includes two cells in this example. Furthermore, both cells in each system are the same in this example. However, a battery system, which may be subjected to a sequential discharge as described herein, may include any number of battery cells. These battery cells are divided into two or more sets, which are independently discharged. Each set may include one or more batteries. In some embodiments, all batteries in the same set have the same type. Alternatively, different types of batteries are combined in the same set. Different sets may be formed from the same type of cells. The difference is power output capabilities may exist (at least at some stages during operation of these sets) due to state of charge, temperature, number of cells in each set, interconnection of cells in each set and other factors. Alternatively, different sets may be formed using different types of battery cells. The types of cells may be one of the factors determining (and differentiating) the power output capabilities of the sets.

Returning to the example, both battery cells of a first battery system are discharged and charged at the same time. As such, the state of charge of each battery cell in this first battery system is the same at each given time. Furthermore, the overall state of charge of the first battery system would be the same as any one of the battery cells in this system. Referring to FIG. 2B, the individual state of charge of each battery in the first battery system and the overall state of charge of the first battery system are represented by the same line 212.

Alternatively, the two battery cells of a second battery system are discharged in a staged manner. Specifically, the first battery cell of this system is discharged prior to discharging the second battery cell. For illustration, in this example presented in FIG. 2B, the first battery cell is fully discharged (i.e., to 0% state of charge) before initiating the discharge of the second battery. The discharge profile of the first battery cell is shown with line 214, while the discharge profile of the second battery cell is shown with line 216. The discharge of the first battery cell ends at t=2.5 (based on the timescale presented on the horizontal axis of FIG. 2B). The second battery cell starts being discharged at that time and continues to supply power until t=5. It should be noted that the second battery cell remains fully charged (i.e., at 100% state of charge), while the first battery cell is being discharged, i.e., during the time period t=0 to t=2.5. As such, the power output capabilities of the second battery system during this period is at least the power output capability of the fully charged second battery cell as further described below. The state of charge for the entire second battery system is represented by line 212, which is the same as the line representing the state of charge of the first battery system. As such, at the battery system level, both battery systems are discharged equivalently. However, at the battery cell levels, these battery systems are discharged differently and provide different power output capabilities, as will now be explained.

As noted above, the power capability of a battery cell diminishes as the battery cell is discharged. For this example and illustration, it is assumed that a cell has a full power output capability (i.e., 100% on the vertical axis in FIG. 2B), when the cell has at least 80% state of charge (i.e., 80-100% SOC). When the cell is discharged below 80% state of charge, its power output capability drops to 25% and stays at that level until the cell is completely discharged. For this example and, the full power output capability of a cell is assumed to be 100 W, while the power output capability of 25% is 25 W. These numbers are arbitrary and selected for illustration only. One having ordinary skill in the art would understand various design parameters effecting the power output capability of a cell.

Described herein is an illustrative model of the power output capability. Of course, one having ordinary skill in the art would understand that the actual relationship between the power output capability and state of charge is more complex than presented above. However, this more complex relationship does not change the nature of the staged discharge process.

Next, the power output capability model is scaled to the two battery systems. In the first battery system, both battery cells are discharged simultaneously and reach the 80% state of charge point at the same time, i.e., at t=1 as shown in FIG. 2B. The power output capability of each cell and the entire first battery system will drop from 100% (200 W representing 100 W of the first cell and 100 W of the second cell) to 25% (50 W representing 25 W of the first cell and 25 W of the second cell) at this point as shown by line 222. The first battery system can be further discharged until it is fully discharged (i.e., during the time period between t=1 and t=5), but this discharge is limited to a reduced power level of 25%.

In the second battery system, the first battery cell is discharged before the second battery cell. In this particular example, the second battery cell is maintained at 100% state of charge until the first battery cell is completely discharged. When the first battery cell drops below the 80% state of charge (at 0.5 time period), the power output capability of this cell drops to 25% (i.e., 25 W) based on the above-described assumption. However, the second battery cell is still fully charged (i.e., at the 100% state of charge) at that time, and its power output capability remains at 100% (i.e., 100 W). The power output capability of the entire second battery system is calculated as the sum of power capabilities of its cells (i.e., 125 W representing 25 W of the first cell and 100 W of the second cell). As such, when the state of charge of the first battery cell drops below 80% (at 0.5 time period), the power output capability of the entire second battery system (containing this cell) drops from 100% (200 W) to 62.5% (125 W). This power output capability drop is reflected (in FIG. 2B at 0.5 time period) by line 224, which represents the power output capability of the second battery system. The 62.5% power output capability is maintained until the second battery cell is discharged below the 80% state of charge, which according to the example presented in FIG. 2B does not occur until t=3. Once the second battery cell is discharged below 80%, the power output capability of the entire second battery system drops to 25% and line 224 coincides with line 222, indicating that power capabilities of both battery systems are the same beyond this point.

To summarize this example, the power output capability of the first battery system is 100% during the period t=0 to t=1 and then 25% during the period t=1 to t=5. On the other hand, the power output capability of the second battery system is 100% during the period t=0 to t=0.5, then 62.5% during the period t=0.5 to t=3, and finally 25% during the period t=3 to t=5. Assuming that an application requires a 50% power output capability to perform a certain operation (e.g., accelerate a vehicle), the second battery system can support this power demand during the period t=0 to t=3, while the first battery system can only support this power demand during the period t=0 to t=1. This example clearly illustrates that a sequential discharge of battery cells may allow retaining higher power output capabilities for longer periods of times. One having ordinary skill in the art would understand that this example could be extended to a battery system having any number of cells discharged sequentially as individual cells and/or sets of multiple cells.

FIG. 2C is a schematic illustration of battery system 230, which may be used for independent (e.g., sequential) discharge, in accordance with some embodiments. As shown, battery system 230 includes first battery cell 232a and second battery cell 232b. Other battery cells (e.g., third battery cell 232c and fourth battery cell 232d are shown as optional) may be included, but these battery cells are optionally. When battery system 230 includes more than two battery cells, these battery cells may be grouped and interconnected into two or more sets of cells. All cells in each set may be discharged simultaneously, while different sets are discharged independently, e.g., sequentially. Battery system 230 includes at least two sets of such cells. Each set may include any number of battery cells, such as one or more battery cells. For example, when battery system includes third battery cell 232c in addition to first battery cell 232a and second battery cell 232b, third battery cell 232c may be in the same set with first battery cell 232a or second battery cell 232b (e.g., in a two-set battery system configuration) or form an independent set (e.g., in a three-set battery system configuration). For simplicity, FIG. 2C illustrates an example in which each cell represents a separate set. However, one having ordinary skill in the art would understand various other arrangements in which multiple cells (two or more cells) form two or more independent controlled sets.

Each set of battery cell may be equipped within its own converter. In some embodiments, one set (e.g., the power set) has a direct connection to the load device without a converter, while another set may be connected through a converter. For example, FIG. 2C illustrates first battery cell 232a forming a first set connected to first converter 234a, second battery cell 232b forming a second set connected to second converter 234b, and so on. Second converter 234b may be optional and, in some embodiments, second battery cell 232b forming a second set may be connected to inverter 237 without any intermediate converter. In this example, first battery cell 232a forming a first set may still be connected inverter using first converter 234a, which may be used to balance the voltage output between the first set and the second set and be controlled (e.g., by controller 236) to determine the discharge profile of each set.

Regardless of the number of converters (e.g., one or two) used for the first set and the second set, these converters may be turned on and off using, for example, controller 236 based on the state of charge of each cell and power requirements. In some embodiments, controller 236 may control cross-charging of first battery cell 232a and second battery cell 232b, e.g., discharging first battery cell 232a while charging second battery cell 232b, or charging first battery cell 232a while discharging second battery cell 232b.

Converter 234a and optionally, converter, 234b may be also used for cross-charging first battery cell 232a and second battery cell 232b, voltage balancing (e.g., when first battery cell 232a and second battery cell 232b have different operating voltages and/or brought to different states of charges), and perform various other functions. Alternatively, battery system 230 may include switched for independently connecting and disconnecting first battery cell 232a and second battery cell 232b from the rest of battery system 230.

Battery system 230 may be also include load device 238, which uses power supplied by first battery cell 232a, second battery cell 232b, and any other battery cells (if present). Load device 238 may be an electrical motor, heater, grid, or any other electrical power consuming device. Depending on the type of load device, battery system 230 may also include inverter 237, e.g., when load device 238 uses AC for its operation.

In some embodiments, converters 234a and 234b are DC-DC converters. Such a converter may include three nodes. A first node may be coupled with a first pole of a battery cell set and electrically connected with a first pole of a load device. A second node may be coupled with a second pole of the batter cell set. A third node of the converter may be electrically connected with a second pole of the load device. The converter may include a primary circuit tied to the first and second nodes and a secondary circuit including a direct conduction path for electrical current to pass from the second to third node. The converter may or may not include a galvanically isolated energy transfer path between the primary circuit and the secondary circuit. A voltage output from the secondary circuit adds to (or subtracts from) the voltage of the set of battery cells at the second node. Additional details and examples of such DC-DC converters are described in WO/2015/031908 (filed as PCT/US2014/053750), entitled "DC-DC CONVERTER FOR BATTERY SYSTEM WITH WIDE OPERATING VOLTAGE RANGE" which is incorporated herein in its entirety for purposes of describing DC-DC converters suitable for battery systems.

Controller 236 may be used to perform various control functions of battery system 230. Specifically, controller 236 may be configured to monitor the current power output capabilities of each set of battery cells and compared these capabilities to the current power demand. Furthermore, controller 236 may select one or more sets of battery cells for discharge based on this comparison and instruct other devices to connect or disconnect these sets from load device 238. Various operations of controller 236 will now be described with reference to FIG. 2D. Furthermore, this description provides some additional details of various components of battery system 230. It should be noted that independent charging may be performed in a manner similar to independent discharging examples.

FIG. 2D is a process flowchart of method 240 for powering a load device using two or more sets of battery cells discharged independently, in accordance with some embodiments. Method 240 may commence with providing a battery system during operation 241. Various examples of battery systems are described above with reference to FIG. 2C. In some embodiments, the battery system includes a first set of one or more first battery cells and a second set of one or more second battery cells. The first set and second set may be electrically coupled to a load device and configured to power to the load device. Specifically, discharging one or both sets may be used to power the load device. It should be noted that this electrical coupling may involve various other components, such as inverters, converters, wiring, controllers, and/or other like components.

The first set of battery cells has a first power output capability when the first set is at a first state of charge. The second set has a second power output capability when the second set is at a second state of charge. The second power output capability is greater than the first power output capability. As described above, the power capabilities of battery cells may change with the state of charge of these cells. It should be noted that the power capability comparison of the two sets presented above refers to the specific states of charges of these sets.

In some embodiments, the total discharge capacity of the first set is greater than the total discharge capacity of the second set. As such, the first set may be referred to as an energy set, while the second set may be referred to as a power set. Furthermore, the one or more first cells of the first set may be referred to as energy cells, while the one or more second cells of the second set may be referred to as power cells.

In some embodiments, the operating voltage of the first set at the first state of charge is less than the operating voltage of the second set at the second state of charge. Furthermore, the discharge rate of the first set at the first state of charge may be less than the discharge rate of the second set at the second state of charge. The power capability is determined as a function of state of charge, temperature, cell impedance and cell voltage limits.

Method 240 may proceed with discharging the first set to the first state of charge during operation 242. As such, the first set may be at a higher state of charge (than the first state of charge) prior to operation 242. After the first set is discharged to the first state of charge (e.g., at the end of operation 242), the second set is at the second state of charge. During operation 242, the second set may remain at the second state of charge (i.e., not change its state of charge). For example, only the first set may be used to power the load device during operation 242. Alternatively, the second set may be discharged during operation 242. In other words, the second set may have a higher state of charge (than the second state of charge) prior to operation 242 and have the second state of charge at the end of operation 242. As such, both sets may be discharged and used to power the load device during operation 242. On other hand, the second set may charge during operation 242. In other words, the second set may have a lower state of charge (than the second state of charge) prior to operation 242 and have the second state of charge at the end of operation 242. For example, a power generated while discharging the first set may be used (e.g., in part) to charge the second set during operation 242. In some embodiments, the second state of charge is 100% of a total capacity of the second set. Alternatively, the second state of charge is less than the first state of charge.

The electrical power provided during operation 242 may be used to power the load device and/or some other operations. For example, this electrical power may be used to heat one or more battery cells in the second set when the battery system is a low temperature prior to operation 242. In some embodiments, the battery cells of the second set may be more sensitive to temperature variations than the batteries of the first set as further described below.

Method 240 may proceed with discharging the second set below the second state of charge during operation 244. It should be noted that operation 244 is performed after operation 242, i.e., after the first set is discharged to the first state of charge. Operation 244 may be performed when the first power output capability (i.e., the capability of the first set at the end of operation 242) is not sufficient to, for example, to operate the load device. For example, a vehicle equipped with the battery system may cruise (using a low power level) during operation 242 but may need to accelerate during operation 244. The first power set may not have a sufficient power output capability to accelerate the vehicle, and the second set is used in addition or instead of the first set.

In some embodiments, energy provided by the first set during operation 242 may be used to heat up the second set or, more specifically, to bring the temperature of the second set to the operating level. Upon reaching the operating temperature, the second set may be discharged during operation 244. The energy from the second set may be used, for example, to move the vehicle. In some embodiments, at least some energy from the second set (provided during operation 244) may be used to recharge the first set during optional operation 245.

In some embodiments, the first set is maintained at the first state of charge while discharging the second set during operation 244. In other words, the first set may not be further discharged or charged during this operation. For example, the first set may be disconnected from the load device and from the second set at that time.

In some embodiments, method 240 also involves discharging the first set below the first state of charge during optional operation 246. Specifically, this operation may be performed if the first set has some remaining capacity, i.e., if the first state of charge is above 0%. Alternatively, if the first state of charge is at 0%, operation 246 is not performed. In some embodiments, the first set may be recharged when the external power is supplied to the power system, e.g., by connecting to a charge, regenerative braking, and the like.

When the first set is discharged below the first state of charge during operation 246, the power output capability of provided by this set may be at or below of the first power output capability, i.e., when the first set is at the first state of charge. Alternatively, the power output capability may be increased by, for example, heating up the first set during operation 242 and/or operation 244. In some embodiments, operation 246 may at least partially overlap with discharging the second set (e.g., during operation 244 described above or during operation 250 described below). In other words, both sets may be discharged at the same time for at least a period of time. This overlap may be used, for example, when an individual power output capability of either set is not sufficient but when a combined power output capability may be still used.

In some embodiments, discharging the first set below the first state of charge during optional operation 246 involves charging the second set as shown by block 248. For example, the second set may be charged back to the second state of charge or even above the second state of charge. This charging may be performed to boost the power output capability of the second set for future uses, such as discharging during operation 250. The first set may have (e.g., in certain conditions) a lower power output capability than the second set, but may have a larger overall capacity. The second set may be used when the power requirements exceed the power output capabilities of the first set. The second set may be recharged back using the first set when, for example, some additional power is available from the first set (e.g., when the power requirement is less than the power output capability) of the second set. This cycle may be repeated multiple times during the process.

In some embodiments, method 240 also involves discharging the second set during optional operation 250. Specifically, this operation may be performed if the second set has some remaining capacity, i.e., if the second state of charge is above 0%. Alternatively, if the second state of charge is at 0%, operation 250 is not performed. In some embodiments, the second set may be recharged (during operation 248) using power from the first set or externally supplied power to the power system, e.g., by connecting to a charge, regenerative braking, and the like. When the external power is supplied to the battery system, this power may be used to recharge one or both set. For example, if both sets are at least partially discharged, then the external power may be first used to recharge the set with a higher current power output capability.

As such, when power is supplied by the battery system, then the set with a lower current power output capability may be discharged first (assuming that its power output is sufficient to meet the current power demand or may be combined with the power output of another set). On the hand, when power is supplied to the battery system, then the set with a higher current power output capability may be charged first (assuming that it is partially discharged).

Different types of battery cells typically have different characteristics, such as power output capabilities, energy densities, and the like. For example, many lithium ion batteries built with liquid electrolytes may have high power output capabilities and may be operable at a wide temperature range in comparison, for example, to some rechargeable batteries built with solid electrolytes. On the other hand, energy density of some solid electrolyte batteries may be much higher than that of lithium ion batteries. At the same time, different battery applications may have different operating profiles, including different temperature and power demand profiles. For example, a battery system may be exposed to different temperatures during its operation and/or may be used to provide different power outputs at different times. A specific example of battery applications is an automotive battery system. At one operation condition, a battery pack may be cooled down to $-20°$ C. (e.g., when the car is parked in a cold environment for a prolonged period of time). The battery pack may be then used to power the car, such as move the car, heat the interior of the car and/or battery cells, and operate various other electrical devices (e.g., lights, radio, and the like). While a certain type of battery cells (e.g., lithium ion cells with liquid electrolytes and specific electrode material) may be well suited for this operating condition, this battery cell type may have a poor energy density and limit the driving range of the car in comparison to other types of batteries that may not be suitable for $-20°$ C. operation.

Often, various compromises are made when designing power systems, resulting in more expensive (as well bulky and heavy) battery packs and/or sacrificing performance. For example, most conventional battery powered vehicles use a single type of battery cells for the entire battery system. Most often, an entire battery pack is assembled using only lithium ion battery cells or only nickel metal hydride battery cells. As such, the same type of battery cells is used for all operating conditions (low and high temperatures, low and high power demands, and the like). These compromises significantly slowed down the adoption of battery technology for many applications, such as vehicles.

Provided are methods and systems using two different types of battery cells in the same battery system to power the same load device (or the same group of devices, such as all electrically load devices of a vehicle). The different types of battery cells are selectively discharged based on their current power output capabilities and power demands of the device powered by these cells similar to examples described above. For example, one type of battery cells may form a first set. These cells may have a higher power output capability at low temperatures than another type of battery cells, which may form a second set. As such, when the battery system is at a low temperature, the first set may be used to power the device and/or to heat up the second set. The second set may have a higher energy density (than the first set) and may help to improve the overall capacity for the battery system for a given volume and/or weight allocated to the battery system.

For many applications, two key characteristics of battery cells are power output capability and energy density (e.g., a gravimetric energy density and/or volumetric energy density). The power output capability indicates how much electrical power a battery cell can provide at a particular time. The power output capability of the same battery cell may be impacted by the temperature, state of charge, and other factors. Some types of battery cells are more sensitive to these factors than others. Furthermore, battery cells optimized for power capability usually offer reduced energy density, and vice versa. This balance may depend on the active materials used for positive and negative electrodes, construction of the electrodes (e.g., thickness, porosity, concentration of conductive additives), electrolyte state (e.g., liquid, solid) and composition, and other factors.

An example of one performance characteristic of two types of battery cells is illustrated in FIG. 3A-1. Specifically, FIG. 3A-1 presents discharge curves 302 and 304 represented by a discharge potential as a function of the discharged capacity (reflective of the state of charge) for a given discharge rate. The battery cell represented by discharge curve 302 may be referred to as a power battery cell because it has a higher discharge potential for the most part. However, it has a lower capacity than the battery cell represented by discharge curve 304, which may be referred to as an energy battery cell. In fact, the discharge potential of the power battery cell drops below the operational cutoff at a capacity identified by 0.5×. On the other hand, the energy battery cell is still operation as it being discharged beyond this level. The power and energy battery cells have their respective benefits and drawbacks as represented by FIG. 3A-1. Combining these types of cells in the same battery system may help to more efficiently utilized the benefits and overcome the drawbacks.

FIG. 3A-2 presents a graph illustrating the cell power capability vs. temperature for two types of battery cells forming a battery system as well as for the system as a whole, in accordance with some embodiments. The power capabilities are presented in kilowatts (kW). Specifically, at $-40°$ C., the power capability of each type of battery cells may be at its minimum and below the minimum operating power limit, which may be about 25 kW for this example. At about $-20°$ C., the power capability of the first set (and, as a result, of the system) exceeds the minimum operating power limit and may provide limited operation of a load device. The full operation of the load device may use the power up to the power peak level, which may be about 300 kW in this example. It should be noted that, the power capability of the second set at $-20°$ C. is still below the minimum operating power limit. As shown in FIG. 3A-2, the second set does not reach its full power output capability until it is heated to at least about $+40°$ C. The first set reaches its full power output capability when it is heated to at least about $+25$-$30°$ C. In this example, the total power output capability from both sets exceeds the power peak level when both sets are heated to about $+15°$ C.

The disclosed methods are applicable to any battery cells that may be pre-heated in order to improve their performance. Many solid state batteries need to be heated to at least about $10°$ C., or at least about $15°$ C., or at least about $20°$ C. to perform well (e.g., at full power), and thus may not be fully operational when cooled below these temperatures. These methods are applicable to battery cells, batteries, battery packs, and collections of batteries and battery packs, all of which may be used to form battery systems to power a load device. In some solid state battery cells, such as those having conversion active material cathodes, the batteries are maintained at least about $10°$ C., or at least about $15°$ C., or at least about $20°$ C., or at least about $30°$ C., or at least about $40°$ C., or at least about $50°$ C., or at least about $60°$ C., or at least about $70°$ C., or at least about $80°$ C., or at least about $90°$ C., during their discharge.

To better understand synergetic effects of combining different types of battery cells, some operating conditions associated with their applications may be first considered. FIG. 3B illustrates battery temperature profile 314 and power demand profile 316, both presented as a functions of time for one example of battery applications, such as a vehicle application. Initially (time=0), the battery temperature may be low (temperature=0). For example, the car may be parked outside during a cold day and remain in this cold environment for a prolonged period of time. As described above, the temperature may impact the power output capability, with many types of battery cells being particularly sensitive to the temperature. When some initial power is needed at this point (power demand=1), battery cells (first battery cells) capable of operating at this low temperature may be used. In addition to supplying the power to meet the demand, some power may be used to heat up the battery system and, in particular, battery cells (second battery cells) that may be more sensitive to the temperature and not capable of operating at low temperature. These second battery cells may not be discharged during this initial period. This heating is reflected with line 314, which increases from the initial temperature (temperature=0) to an operating temperature level (temperature=6) at two time periods (time=2). It should be noted that the entire battery system may have the same operating temperature. Alternatively, different sets of the same battery system may have different operating temperature ranges (e.g., the operating temperature range of the energy set may have at higher temperatures than that of the power set). For simplicity, FIG. 3B considers only one operating level.

Once the temperature reaches the operational level, the battery system may support some peak power demands as reflected by line 316 (power demand peaking at 5 for a short period of time at time=2). For example, in the vehicle application, these power peaks may be attributed to vehicle's rapid acceleration. Up until the battery system is capable of supporting such power peaks, the use of the vehicle may be restricted to, for example, slow accelerations and/or warming up of the components. FIG. 3B also illustrate drops in the power demand (e.g., at about time=3.5), which may be attributed to the vehicle stopping and even going into a power regenerative mode.

The power demand profile presented in FIG. 3B is also compared to power capabilities of a battery system having two types of cells in FIG. 3C. Specifically, FIG. 3C illustrates a power capability profile of an energy set formed using one or more energy battery cells (line 322). FIG. 3C also illustrates power capability profile of a power set formed by one or more power cells (line 324). Furthermore, FIG. 3C illustrates total power capability profile of both sets (line 326). Line 316 represents the power demand profile and is the same as in FIG. 3B.

Some designs of conventional battery cells sacrifice energy density in order to provide sufficient power output. For example, a volumetric energy density of a typical battery pack used for electrical vehicles is about 200-250 Wh/L. In comparison, a similar pack assembled from energy cells may increase this volumetric energy density to about 400-500 Wh/L level. While this pack (made entirely from the energy cells) may not provide sufficient power output capabilities, combining the energy set with a power set may yield the needed power output capabilities. Furthermore, battery cells that have a particular high power output capabilities may be used for the power set despite their low energy densities. In some embodiments, the power set may have a volumetric energy density of about 50-150 Wh/L.

Line 322, representing the energy set, may have very limited or no power capability initially (time=0). This may be attributed to the energy cells being sensitive to the temperature and the battery system being at a low temperature, at least initially (e.g., a vehicle parked outside on a cold day). The power capability of this energy set may increase to the operating level (reached at about time=1.75 and being slightly above 3) and stay at this level until this set is discharged to the level that reduces its power output capability (at about time=4.75). Of course, line 322 is a schematic representation of a particular example and the power capability of this energy set may various different profiled impacted by the temperature, discharging rates, discharging state, and other factors.

Line 324, representing the power set, may have some usable power capability even initially (e.g., despite the low temperature of the battery system). As such, the power may be drawn from this set to operate the device (e.g., drive the vehicle) and, in some embodiments, to warm up the battery system. This warm up process may improve the power output capabilities of the power set (up to about time=2) in additional to improving the power output capabilities of the energy set as described above. In some embodiments, the power set may be used to supply most (or even all) of the power during this period. This reliance on the power set may cause the set to become discharged resulting in the drop of the power capabilities (time range of 2-3). In some embodiments, the power from the energy set may be use to recharge the power set and increase its power capabilities (time range of 3-4). The power set may be later used to provide power, for example, during peaks of power demand (e.g., one starting at time 4). One point reflected in FIG. 3C is that neither the power set nor the energy set by itself is not capable of supporting some peak power demands in this example and reflected by line 316, such as at time=2 and at time=4. While the above description refers to a single power demand profile, some applications (e.g., vehicles) may have multiple demand profiles, such as a peak power demand profile and a minimum operating power level demand profile. For example, the battery system may be still used when the peak power demand profile cannot be reached with the total power capability. For example, a vehicle cannot be operated at a high speed or be driven up a hill. However, the battery system may still have adequate power capability to meet the minimum operating power limit profile and operate the vehicle at a reduced power level (e.g., ensure the vehicle possesses a minimum performance capability, operate vehicle lights and/or climate system).

FIG. 3D-1 an example of battery system 330 including two different types of battery cells (battery cells 332a and 332b). Battery system 330 may include one cell or more cells of each type. All cells (regardless of the number) of the same type may be referred to a set. For example, a first set may include first battery cell 332a and third battery cell 332c, while a second set may include second battery cell 332a and fourth battery cell 332d. Battery cell 332c and 332d are optional cells and may not be present. The battery cells of the same set may be grouped together in the same space (e.g., if they have different operating temperature ranges) or distributed throughout the battery system and intermixed with battery cells from another set (e.g., for thermal uniformity between the two sets).

In some embodiments, the first set of battery cells has a first power output capability and first energy density. The one or more first battery cells may include a conversion chemistry material. The second set of one or more second battery cells has a second power output capability and second energy density, such that the first power output capability in some embodiments is lower than the second power output capability. Furthermore, the first energy density may be lower than the second energy density.

In some embodiments, battery system 330 also includes controller 336 configured to control discharging one or both of the first set and the second set based on a current power demand and based on the second power output capability. Specifically, controller 336 may be configured to implement various operations of the method described below. In some embodiments, controller 336 is configured to connect or disconnect each set from load device 338 by operating switches or controlling operations of one or more converters 334a-334b. Specifically, converter 334a may connect first battery cell 332a to inverter 337. Other converters are optional as shown with dashed lines in FIG. 3D-1. For example, second battery cell 332b may be connected to inverter 337 without an intermediate converter. In this example, converter 334a alone may be responsible for balancing voltage output of both sets, e.g., the first set including first battery cell 332a and the second set including second battery cell 332b. Various examples and details of converters 334a-334b and inverter 337 are described above with reference to FIG. 2C.

In some embodiments, battery system 330 may include a battery thermal management system, which may include first heater 333a and second heater 333c and, in some embodiments, heat insulation 335 separating, for example, one set of battery cells from another set. First heater 333a and second heater 333c may be specific to their respective sets or even specific to battery cells or be shared by all sets. In some embodiments, the battery thermal management system may include a cooling system. Some and even all components of the battery thermal management system may be shared with a vehicle which is powered by battery system 330. The battery thermal management system may determine heating conditions and preheating lead times, based on input parameters to predictively and dynamically heat a set of battery cells so that the set has a specific power output capabilities and performance level when used in vehicle applications. Various examples of such battery thermal management systems are described in US Patent Publication No. 2016-0059733 A1, filed Aug. 27, 2015, entitled BATTERY THERMAL MANAGEMENT SYSTEM AND METHODS OF USE, which is incorporated herein by reference in its entirety for purposes of describing battery thermal management systems.

In some embodiments, a battery thermal management system may share thermal circuits with vehicle powertrain and/or climate control components. For example, two battery sets may be used is a hybrid electrical vehicle that is also equipped with an inter combustion engine. The heat from operation of the combustion engine may be used to heat up the batteries. Various examples of such battery thermal management systems are described in International Patent Application Publication No. WO 2015/103548, entitled THERMAL MANAGEMENT SYSTEM FOR VEHICLES WITH AN ELECTRIC POWERTRAIN, which is incorporated herein by reference in its entirety for purposes of describing battery thermal management systems. One example of a battery thermal management system is shown in FIG. 3D-2.

FIG. 3E-1 is a process flowchart of method 340 of operating a battery system having two different types of battery cells, in accordance with some embodiments. Method 340 may commence with providing a battery system during operation 342. The battery system includes a first set of one or more first battery cells and a second set of one or more second battery cells. Various examples of battery systems and components of such battery systems are described above with reference to FIG. 3D-1.

The first set has a first power output capability and a first energy density. The second set has a second power output capability and a second energy density. The first power output capability is in certain conditions higher than the second power output capability. One having ordinary skill in the art would understand this relationship of average power output capabilities and the fact that in some instances (e.g., at some temperature, states of charges) the first power output capability may be lower the second power output capability. However, these instances represent a small fraction of all operating possibilities that the battery system may experience. Furthermore, the first energy density is lower than the second energy density. Based on the above, the first set may be referred to as a power set, while the second set may be referred to as an energy set.

In some embodiments, the ratio of the gravimetric energy density of the second set to the gravimetric energy density of the second set is between 1.5 and 10 or, more specifically, between 3 and 8. This ratio may depend on the type of battery cells used for the first set and for the second set. In the same or other embodiments, the ratio of the volumetric energy density of the second set to the volumetric energy density of the second set is between 1.5 and 15 or, more specifically, between about 6 and 10.

In some embodiments, the total capacity of the first set is less than the total capacity of the second set. For example, the ratio of the total capacity of the second set to the total capacity of the first set maybe between 1.5 and 20 or, more specifically, between 7 and 15, such as about 10. This ratio may be determined by the application of the battery system (e.g., powering a vehicle used on urban streets v. powering a vehicle used primarily on highways, powering a vehicle used in hot climates v. powering a vehicle used in cold climates, and the like).

In some embodiments, a ratio of the first power output capability to the second power output capability varies with a temperature of the first set and with a temperature of the second set. In other words, thermal sensitivities of the battery cells in the first set and the second set may be different. For example, the battery cells in the second set may lose their power output capability faster than the battery cells in the first set when the battery system is cooled down from its operating temperature. Specifically, the first power output capability may be less sensitive to the temperature of the first set than the second power output capability relative the temperature of the second set.

In some embodiments, the one or more first battery cells of the first set comprise a liquid electrolyte. These cells may include one of lithium iron phosphate, lithium nickel cobalt aluminum oxide, lithium nickel manganese cobalt oxide, lithium cobalt oxide, or lithium-rich nickel manganese oxide on a positive electrode and comprise one of lithium titanate or graphite on a negative electrode. Other examples of intercalation and alloying electrode active materials suitable for these cells are described above.

In some embodiments, the one or more second battery cells of the second set comprise a conversion chemistry material, such as $FeF_2$, $FeO_dF_{3-2d}$ (where $0 \leq d \leq 0.5$), $FeF_3$, $CoF_3$, $CoF_2$, $CuF_2$, or $NiF_2$. In some embodiments, the one or more second battery cells of the second set comprise a solid electrolyte. Other examples of conversion chemistry materials suitable for these cells are described above.

Method 340 may proceed with selectively discharging one or both sets during operation 344. The sets being discharged are selected based on a current power demand and based on the second power output capability. Operation may be repeated one or more times as reflected by decision block 360, until both sets (e.g., individually or as a combination) cannot meet the current power demand.

Operation 344 may involve various other operations that may be performed on not depending on various conditions. Specifically, FIG. 3E-1 illustrate decision block 346 in which the current power demand is compared to the current power capability of the second set (i.e., the energy set). It should be noted that the power demand may change (e.g., a vehicle may accelerate, new devices may turned on or off). Likewise, the power capability of the second set may change (e.g., due to the changes in temperature and/or state or charge).

If the current power demand is less than the second power output capability, then the second set is discharged as shown by block 348. The second set may be discharged without discharging the first set. In some embodiments, the power set is discharged together with the energy set even though the energy set alone is sufficient to provide all power. For example, the state of charge of the power set may be kept below the maximum to preserve the operating lifetime of the battery. In some embodiments, the second set may be charged while discharging the first set and, for example, using the power supplied by the first set. This process may be referred to as cross-charging.

On the other hand, if the current power demand is greater than the second power output capability, then the first set is discharged as show by block 350. The first set may be discharged without discharging the second set. For example, the power output capability of the first set may be minimal because the first set is completely discharged and/or at a low temperature or some other conditions that limit the power output capability of the first set. Alternatively, the first set may be discharged together with discharging the second set. For example, neither the power output capability of the first set nor the power output capability of the second set by itself may be sufficient to meet the power demand and both sets need to be discharged at the same time.

In some embodiments, discharging one of the first set or the second involves heating another one of the first battery or the second battery. For example, the second set (i.e., the energy set) may be less capable of operating at low temperature than the first set (i.e., the power set). As such, if operation 344 is performed while the battery system is at the low temperature, then the second set may have poor power output capabilities until it is warned up. In this case, discharging the first set may involve heating the second set or, more specifically, power from the first set may be used for heating the second set. In this example, discharging the first set may also involve heating the first set in addition to heating the second set.

While various examples described herein refer to independent discharging of two sets of battery cells, one having ordinary skill in the art that these examples may be also applied to independent charging of these sets or various combinations of charging and discharging.

FIG. 3E-2 illustrates a process flowchart corresponding to method 600 of operating a controller used to independently control discharge (and in some cases, charge) of different sets of battery cells of a battery system, in accordance with some embodiments. Method 600 may commence with evaluating the power demand during operation 602. The power demand may vary depending on the operating conditions of one or more load devices powered by the battery system. For example, when the battery system is used on a vehicle, the power demand may change depending on acceleration, current speed, road conditions (e.g., incline or decline), use of auxiliary devices (e.g., lights, heater, air conditioner), and the like. Method 600 may then proceed with evaluating the power output capability of the first set (during operation 604) and evaluating the power output capability of the second set (during operation 606). These operations may involve monitoring the voltage of the sets at a given load, open circuit voltage, and/or other parameters. If the current power output capability of one or both sets is greater than the current power demand (as shown by decision block 608), then the controller may allocate the power command to use these one or more sets during operation 610. This command may be sent to one or more converters connected to the one or more sets of battery cells during operation 612. In some cases, additional capabilities of the second set may be evaluated (as shown by decision block 614). In this case, the second set may be used as a primary source of the power. Alternatively, the both sets may be used as sources of the power corresponding power commands are sent to the converters during operation 616. The process may be repeated starting with operation 602.

Alternatively, if the current power output capability of one or both sets is less or only equal than the current power demand (as shown by decision block 608), then the controller may check whether the combined power capability is sufficient to meet the minimum operating power limit (as shown by decision block 622). If the combined power capability is not sufficient to meet the minimum operating power level, the error message may be generated during operation 624 and method 600 may be stopped until the sets are further charged. On the other hand, if the combined power capability is sufficient to meet the minimum power operating level, then the controller may allocate the power command to use the one or more sets the minimum operating power (as shown by block 626). This power command is then send to the converter during operation 628. If it is determined that the second set has some additional power capabilities (as shown by decision block 630), then the controller may instruct the converters to initiate cross-charging of the sets (e.g., charge the first by discharging the second set) by assigning cross-charging command (e.g., charging the first set using remaining capacity of the second set) during operation 632.

When a battery system has two or more independently controlled battery sets these battery sets may be electrically coupled together to provide an overall power output of the battery system. However, having using different types of batteries and/or discharging batteries in different ways may require special equipment to control and balance power provided by each set. For example, each set may be equipped with a separate converter as described above. The converter can be quite expensive especially for high power applications such as electrical vehicle and there are strong driving forces to minimize the cost of the battery systems for many applications.

Provided are various examples of drive trains in which different sets of battery cells are electrically coupled to different components of the same electrical motor or even to different motors of the same vehicle. Power is independently provided from the different sets of battery cells to one or more motors without electrically interconnecting these batteries. For example, an electrical motor may include two stators each magnetically coupled to the same rotor. One set of battery cells may be electrically coupled to the rotor and one of the stators, while another set of battery cells may be electrically coupled to the rotor and the other stator. In another example, an electrical motor may include two rotors each magnetically coupled to the same stator. One set of battery cells may be electrically coupled to the stator and one of the rotors, while another set of battery cells may be electrically coupled to the stator and the other rotor. In both of these examples, the two sets of battery cells are not electrically coupled to each. Instead, the coupling is performed through the motor and may be referred to as magnetic coupling. In some embodiments, charging of one set may be performed while powering the motor with another set. In other words, the motor may be used to mechanically power, for example, a drive train by discharging one set of battery cells and to generate electricity for charging another set of battery cells. In yet another example, each set of battery cells may power a different motor that may be a part of the same drive train. The motors may be mechanically interconnected by a shaft, through a gear box, or through contact of different wheels with the road.

FIG. 4A is a schematic illustration of drive train 400 including first motor control unit 106a, second motor control unit 106b, first set 102a electrically coupled to first motor control unit 106a, second set 102b electrically coupled to second motor control unit 106b, and electrical motor 402. First set 102a includes one or more first battery cells. Second set 102b includes one or more second battery cells. The operating voltage of first set 102a is different from the operating voltage of second set 102b. This difference may be attributed to the different number of battery cells in each set, different interconnection schemes in each set, different types of battery cells in each set, or other reasons. Electrical motor 402 may include first stator 404a, second stator 404b, and rotor 406, which is electromagnetically coupled to first stator 404a and second stator 404b. First motor control unit 106a is electrically coupled to first stator 404a by a multi-phase AC connection and optionally electrically coupled to rotor 406. Second motor control unit 106b is electrically coupled to second stator 404b by a multi-phase AC connection and optionally electrically coupled to rotor 406. First motor control unit 106a and second motor control unit 106b may be used to independently control the discharge of first set 102a and second set 102b, respectively, to power motor 412. Various examples of using two or more sets of battery cells for powering the same load device are described above and are applicable to drive train 400.

In some embodiments, first motor control unit 106a includes a first DC-AC inverter, while second motor control unit 106a also comprises a second DC-AC inverter. One having ordinary skill in the art understands these inverters may be included for certain types of motor 412, such as AC poly-phase induction motors, permanent magnet synchronous motors, or switched reluctance motors. In some embodiments, motor 412 may be driven by direct current and no inverters may be provided in first motor control unit 106a and second motor control unit 106b. In some embodiments, first set 102a and second set 102b are connected at a common reference potential, for example, to maintain the isolation.

In some embodiments, first motor control unit 106a controls discharge conditions of first battery set 102a independently from discharge conditions of second battery set 102b. In a similar manner, second motor control unit 106b controls discharge conditions of second battery set 102b independently from discharge conditions of first battery set 102a. First motor control unit 106a and second motor control unit 106b may be both connected to central controller 401 for controlling operations of first motor control unit 106a and second motor control unit 106b. For example, first motor control unit 106a and second motor control unit 106b may provide feedback about current power output capabilities of first battery set 102a and second battery set 102b and central controller 401 may compare these capabilities to the current demand and instruct first motor control unit 106a and second motor control unit 106b to use certain discharge rates for each of first battery set 102a and second battery set 102b. In some embodiments, central controller 401 is configured to execute various operations of methods for operating battery systems described above.

In some embodiments, first motor control unit 106a and second motor control unit 106b are connected to converter 403 for cross-charging the first set and the second set. Converter 403 may be connected and controlled by central controller 401.

In some embodiments, the one or more first battery cells include a conversion chemistry material, such as $FeF_2$, $FeO_dF_{3-2d}$ (where $0 \leq d \leq 0.5$), $FeF_3$, $CoF_3$, $CoF_2$, $CuF_2$, or $NiF_2$. The one or more second battery cells may include a solid electrolyte. In the same embodiments, the one or more second battery cells comprise a lithium intercalation material or a lithium alloying material.

FIG. 4B is a schematic illustration of drive train 410 including first motor control unit 106a, second motor control unit 106b, first set 102a electrically coupled to first motor control unit 106a, second set 102b electrically coupled to second motor control unit 106b, and electrical motor 412. First set 102a includes one or more first battery cells. Second set 102b includes one or more second battery cells. The operating voltage of first set 102a is different from the operating voltage of second set 102b. This difference may be attributed to the different number of battery cells in each set, different interconnection schemes in each set, different types of battery cells in each set, or other reasons. Electrical motor 412 may include first rotor 416a, second rotor 416b, and stator 414, which is electromagnetically coupled to first rotor 416a and second rotor 416b. First motor control unit 106a is electrical coupled to first rotor 416a and stator 414. Second motor control unit 106b is electrical coupled to second rotor 416b and stator 414. Other features of drive train 410 may be the same as of drive train 400 described above with reference to FIG. 4A.

FIG. 4C is a schematic illustration of drive train 420 of an electrically powered vehicle, in accordance with some embodiments. Drive train 420 may include first motor control unit 106a, second motor control unit 106b, first set 102a electrically coupled to first motor control unit 106a, second set 102b electrically coupled to second motor control unit 106b, first electrical motor 422a, and second electrical motor 422b. First set 102a includes one or more first battery cells. Second set 102b includes one or more second battery cells. The operating voltage of first set 102a is different from the operating voltage of second set 102b. This difference may be attributed to the different number of battery cells in each set, different interconnection schemes in each set, different types of battery cells in each set, or other reasons. First electrical motor 422a is electrically coupled to first motor control unit 106a. Second electrical motor 422b is electrically coupled to second motor control unit 106b. First electrical motor 422a and and second electrical motor 422b may be mechanically interconnected using a shaft, gearbox, and even a combination of wheel and road. For example, as shown in FIG. 4D, electrically power vehicle 430 may include first wheel 432a and second wheel 432b for supporting electrically powered vehicle 430 on road 434. First wheel 432a is mechanically coupled to first electrical motor 422a, while second wheel 432b is mechanically coupled to second electrical motor 422b. Other features of drive train 410 may be the same as of drive train 400 described above with reference to FIG. 4A.

FIGS. 5A and 5B are schematic representations of battery cell 500 having a lithium sulfide anolyte layer disposed between each pair of a positive electrode and a negative electrode, in accordance with some embodiments. Specifically, battery cell 500 is shown having one or more first electrodes 504 and one or more second electrodes 506. First electrodes 504 and second electrodes 506 are different types, e.g., positive and negative electrodes, and include corresponding active materials, as described above. First electrodes 504 and second electrodes 506 may be arranged as a stack, wound (e.g., wound as a jellyroll), or have any other arrangement such that active material layers of one type of electrodes face active material layers of the other type of electrodes.

First electrodes 504 and second electrodes 506 are in ionic communication with each other using solid electrolyte layers 506. As further described above in this document, the lithium sulfide anolyte layer is a part of each solid electrolyte layer 506 that interfaced with negative electrodes. First electrodes 504 are electrically coupled to first terminal 503 using, for example, first tabs 505. Second electrodes 506 are electrically coupled to second terminal 509 using, for example, second tabs 507. First terminal 503 and second terminal 509 may be used to drive the current between first electrodes 504 and second electrodes 506, for example, to add lithium to negative electrode assemblies and to convert metal sulfides into lithium sulfides during fabrication of the lithium sulfide anolyte layer.

First electrode 504 and second electrode 506 may have a relatively small thickness, for example, to allow a large number of electrodes to be stacked together and fit into the same battery cell. For example, a thickness of each electrode may be between about 20 micrometers and 500 micrometers or, more specifically, between about 50 micrometers and 200 micrometers, such as about 100 micrometers. With 100 to 300 electrodes stacked together, battery cell 500 may have a thickness of between about 10 millimeters and 30 millimeters. It is to be appreciated that other dimensions are possible as well. For example, the number of first electrode 504 and second electrode 506 being stacked together can be based on the electrical characteristics of battery cell 500.

In some embodiments, first tabs 505 may be formed from current collectors of first electrodes 504, while second tabs 507 may be formed from current collectors of second electrodes 506. First terminal 503 and second terminal 509 may be supported by top cover 501. Alternatively, first tabs 505 and second tabs 507 may be structure that are welded, crimped, or otherwise attached to the current collectors of the respective electrodes. Regardless of tab design, first tabs 505 and second tabs 507 may be arranged into two separate groups to provide electrical and thermal interface to first terminal 503 and second terminal 509, respectively. In a specific embodiment, first tabs 505 are welded together and to first terminal 503 and second tabs 507 are welded together and to second terminal 509.

First electrodes 504 and second electrodes 506 may be sealed within an enclosure including case 502 and top cover 501. In some embodiments, case 502 of battery cell 505 is substantially rigid. For example, case 502 may be made of a hard plastic or polymer material. In some embodiments, cell 500 has a housing or claim to maintain a pressure within cell 500 during operation (charge/discharge) of cell 500. In some embodiment, cell 500 has a bladder or foam piece within cell 500 to maintain a pressure within cell 500 during operation (charge/discharge) of cell 500.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A method comprising:
providing a battery system comprising a first set of one or more first battery cells and a second set of one or more second battery cells,
wherein the first set has a first power output capability when the first set is at a first state of charge,
wherein the second set has a second power output capability when the second set is at a second state of charge, and
wherein the second power output capability is greater than the first power output capability;
discharging the first set to the first state of charge,
wherein, after the first set is discharged to the first state of charge, the second set is at the second state of charge; and
after the first set is discharged to the first state of charge, discharging the second set below the second state of charge.

2. The method of claim 1, wherein the first set is maintained at the first state of charge while discharging the second set.

3. The method of claim 1, further comprising discharging the first set below the first state of charge.

4. The method of claim 3, wherein discharging the first set below the first state of charge at least partially overlaps with discharging the second set below the second state of charge.

5. The method of claim 3, wherein discharging the first set below the first state of charge comprises charging the second set.

6. The method of claim 3, further comprising, after discharging the first set below the first state of charge, discharging the second set.

7. The method of claim 1, wherein discharging the first set to the first state of charge comprises heating the second set.

8. The method of claim 1, wherein discharging the second set comprises heating the first set.

9. The method of claim 1, wherein the second state of charge is 100% of a total capacity of the second state.

10. The method of claim 1, wherein the second state of charge is less than the first state of charge.

11. The method of claim 1, wherein a total discharge capacity of the first set is greater than a total discharge capacity of the second set.

12. The method of claim 1, wherein an operating voltage of the first set at the first state of charge is less than an operating voltage of the second set at the second state of charge.

13. The method of claim 1, wherein an operating voltage of the first set at the first state of charge is equal to the operating voltage of the second set at the second state of charge.

14. The method of claim 1, wherein the one or more first battery cells and the one or more second battery cells are the same types of battery cells.

15. The method of claim 1, wherein the one or more first battery cells and the one or more second battery cells are different types of battery cells.

16. The method of claim 1, wherein the first battery cells comprise a conversion chemistry material selected from $FeF_2$, $FeO_dF_{3-2d}$ (where $0 \leq d \leq 0.5$), $FeF_3$, $CoF_3$, $CoF_2$, $CuF_2$, $NiF_2$, and combinations thereof.

17. The method of claim 1, wherein the one or more second battery cells comprise a lithium intercalation material selected from the group consisting of $LiMPO_4$ (M=Fe, Ni, Co, Mn), $LiMn_2O_4$, $LiMn_{2-a}Ni_aO_4$, wherein a is from 0 to 2, $LiCoO_2$, $Li(NiCoMn)O_2$, $Li(NiCoAl)O_2$, and Nickel Cobalt Aluminum Oxides.

18. The method of claim 1, wherein a number of the one or more first battery cells in the first set is different from a number of the one or more second battery cells in the second set.

19. A battery system for performing the method of claim 1 comprising:
a first set of one or more first battery cells,
wherein the one or more first battery cells comprise a conversion chemistry material;
a second set of one or more second battery cells,
wherein the one or more second battery cells comprise a lithium intercalation material or a lithium alloying material; and
a controller for monitoring a state of charge and power capability of each of the first set and the second set and electrically coupling one or more of the first set and the second set to a load device.

20. The method of claim 1, wherein the one or more second battery cells of the second set comprise a conversion chemistry material selected from $FeF_2$, $FeO_dF_{3-2d}$ (where $0 \leq d \leq 0.5$), $FeF_3$, $CoF_3$, $CoF_2$, $CuF_2$, and $NiF_2$.

21. The method of claim 1, wherein the one or more second battery cells of the second set comprise an intercalation material selected from $LiFePO_4$, $LiNi_xMn_{2-x}O_4$, $LiCoO_2$, $Li(NiCoMn)O_2$, $Li(NiCoAl)O_2$ materials, and combinations thereof.

22. The method of claim 1, wherein the intercalation material of the one or more second battery cells is selected from the group consisting of $LiMPO_4$ (M=Fe, Ni, Co, Mn), $LiMn_2O_4$, $LiMn_{2-a}Ni_aO_4$, wherein a is from 0 to 2, $LiCoO_2$, $Li(NiCoMn)O_2$, $Li(NiCoAl)O_2$, and Nickel Cobalt Aluminum Oxides.

23. A method comprising:
providing a battery system comprising a first set of one or more first battery cells and a second set of one or more second battery cells,
wherein the first set has a first power output capability and a first energy density,
wherein the second set has a second power output capability and a second energy density,
wherein the first power output capability is higher than the second power output capability, and
wherein the first energy density is lower than the second energy density;
selectively discharging one or both of the first set and the second set based on a current power demand and based on the second power output capability; and
repeating discharging at least once for a new power demand.

24. The method of claim 23, wherein the first energy density and the second energy density are gravimetric energy densities, and wherein a ratio of the second energy density and the first energy density is between 1.5 and 10.

25. The method of claim 23, wherein the first energy density and the second energy density are volumetric energy densities, and wherein a ratio of the second energy density and the first energy density is between 1.5 and 15.

26. The method of claim 23, wherein, if the current power demand is less than the second power output capability, then the second set is discharged without discharging the first set.

27. The method of claim 23, wherein, if the current power demand is greater than the second power output capability, then the first set is discharged.

28. The method of claim 23, wherein the first set is discharged while discharging the second set.

29. The method of claim 23, further comprising charging the first set while discharging the second set.

30. The method of claim 23, wherein discharging one of the first set or the second comprising heating another one of the first battery or the second battery.

31. The method of claim 23, wherein discharging the first set comprises heating the second set.

32. The method of claim 23, wherein a ratio of the first power output capability to the second power output capability varies with a temperature of the first set and with a temperature of the second set.

33. The method of claim 23, wherein a total capacity of the first set is less than a total capacity of the second set.

34. The method of claim 33, wherein a ratio of the total capacity of the second set to the total capacity of the first set is between 1.5 and 20.

35. The method of claim 23, wherein the one or more first battery cells of the first set comprise a liquid electrolyte.

36. The method of claim 35, wherein the one or more first battery cells of the first set comprise one of lithium iron phosphate, lithium nickel cobalt aluminum oxide, lithium nickel manganese cobalt oxide, lithium cobalt oxide, or lithium-rich nickel manganese oxide on a positive electrode and comprise one of lithium titanate or graphite on a negative electrode.

37. The method of claim 23, wherein the one or more second battery cells of the second set comprise a solid electrolyte.

* * * * *